(12) United States Patent
Healey et al.

(10) Patent No.: US 7,974,182 B2
(45) Date of Patent: Jul. 5, 2011

(54) EVALUATING THE POSITION OF A DISTURBANCE

(75) Inventors: Peter Healey, Ipswich (GB); Edmund S R Sikora, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 792 days.

(21) Appl. No.: 10/594,433

(22) PCT Filed: Mar. 31, 2005

(86) PCT No.: PCT/GB2005/001269
§ 371 (c)(1),
(2), (4) Date: Sep. 26, 2006

(87) PCT Pub. No.: WO2005/095917
PCT Pub. Date: Oct. 13, 2005

(65) Prior Publication Data
US 2008/0232242 A1      Sep. 25, 2008

(30) Foreign Application Priority Data

Mar. 31, 2004  (GB) .................................. 0407386.2

(51) Int. Cl.
*H04L 5/12* (2006.01)
(52) U.S. Cl. ........................................ 370/215; 370/241
(58) Field of Classification Search .................. 370/215, 370/241; 356/35.5, 28.5, 45; 250/227.19
See application file for complete search history.

(56) References Cited

U.S. PATENT DOCUMENTS

| 4,297,887 A | 11/1981 | Bucaro |
| 4,370,610 A | 1/1983 | Allen |
| 4,397,551 A | 8/1983 | Bage |
| 4,443,700 A | 4/1984 | Macedo |

(Continued)

FOREIGN PATENT DOCUMENTS

EP  0251632  7/1988

(Continued)

OTHER PUBLICATIONS

International Search Report mailed Sep. 15, 2005 in International Application No. PCT/GB2005/001269.

(Continued)

*Primary Examiner* — Huy D Vu
*Assistant Examiner* — Omer Mian
(74) *Attorney, Agent, or Firm* — Patterson Thuente Christensen Pedersen, P.A.

(57) ABSTRACT

The position of a disturbance on an optical link is evaluated, in particular where the disturbance is a time-varying disturbance. An optical time domain reflectometry technique is used in which a series of low coherence test pulses is launched by means of an optical pulse source into an the optical link, and the backscattered return signal is monitored. The test pulses pass through an unbalanced Mach Zhender interferometer with the result that for each test pulse, a pair of time-displaced pulse copies is launched onto the link. The backscattered return signal is passed through the same interferometer, which causes the pulse copies of each pair to become realigned and to interfere with one another. A time-varying disturbance is likely to affect each pulse copy of a pair differently. As a result, an abnormality such as a step is likely to occur in the backscattered signal. From the time position of an abnormality, the distance of the disturbance responsible is evaluated.

27 Claims, 9 Drawing Sheets

U.S. PATENT DOCUMENTS

| | | |
|---|---|---|
| 4,463,451 A | 7/1984 | Warmack |
| 4,538,103 A | 8/1985 | Cappon |
| 4,572,949 A | 2/1986 | Bowers et al. |
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman |
| 4,697,926 A | 10/1987 | Youngquist |
| 4,708,471 A | 11/1987 | Beckmann |
| 4,708,480 A | 11/1987 | Sasayama |
| 4,770,535 A | 9/1988 | Kim |
| 4,781,056 A | 11/1988 | Noel |
| 4,805,160 A | 2/1989 | Ishii |
| 4,847,596 A | 7/1989 | Jacobson |
| 4,855,915 A * | 8/1989 | Dallaire .......................... 701/23 |
| 4,885,462 A * | 12/1989 | Dakin ...................... 250/227.19 |
| 4,897,543 A | 1/1990 | Kersey |
| 4,907,856 A | 3/1990 | Hickernell |
| 4,976,507 A | 12/1990 | Udd |
| 4,991,923 A | 2/1991 | Kino |
| 4,994,668 A | 2/1991 | Lagakos |
| 4,994,886 A | 2/1991 | Nadd |
| 5,004,912 A | 4/1991 | Martens |
| 5,015,842 A | 5/1991 | Fradenburgh |
| 5,025,423 A | 6/1991 | Earp |
| 5,046,848 A | 9/1991 | Udd |
| 5,051,965 A | 9/1991 | Poorman |
| 5,093,568 A | 3/1992 | Maycock |
| 5,104,391 A | 4/1992 | Ingle |
| 5,140,559 A | 8/1992 | Fisher |
| 5,173,743 A | 12/1992 | Kim |
| 5,187,362 A | 2/1993 | Keeble |
| 5,191,614 A | 3/1993 | Lecong |
| 5,194,847 A | 3/1993 | Taylor |
| 5,206,924 A | 4/1993 | Kersey |
| 5,223,967 A | 6/1993 | Udd |
| 5,307,410 A | 4/1994 | Bennett |
| 5,311,592 A | 5/1994 | Udd |
| 5,313,266 A | 5/1994 | Keolian |
| 5,319,609 A | 6/1994 | Regnault |
| 5,351,318 A | 9/1994 | Howell |
| 5,355,208 A * | 10/1994 | Crawford et al. ............ 356/35.5 |
| 5,359,412 A | 10/1994 | Schulz |
| 5,361,130 A | 11/1994 | Kersey |
| 5,363,463 A | 11/1994 | Kleinerman |
| 5,373,487 A | 12/1994 | Crawford |
| 5,379,357 A | 1/1995 | Sentsui |
| 5,384,635 A | 1/1995 | Cohen |
| 5,412,464 A | 5/1995 | Thomas |
| 5,457,998 A | 10/1995 | Fujisaki |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert |
| 5,502,782 A | 3/1996 | Smith |
| 5,511,086 A | 4/1996 | Su |
| 5,592,282 A | 1/1997 | Hartog |
| 5,604,318 A | 2/1997 | Fasshauer |
| 5,636,021 A | 6/1997 | Udd |
| 5,637,865 A | 6/1997 | Bullat |
| 5,663,927 A | 9/1997 | Olson |
| 5,691,957 A | 11/1997 | Spiesberger |
| 5,694,114 A | 12/1997 | Udd |
| 5,754,293 A | 5/1998 | Farhadiroushan |
| 5,767,950 A | 6/1998 | Hawver |
| 5,778,114 A | 7/1998 | Eslambolchi |
| 5,936,719 A | 8/1999 | Johnson |
| 5,975,697 A | 11/1999 | Podoleanu |
| 5,982,791 A * | 11/1999 | Sorin et al. ...................... 372/25 |
| 5,991,479 A | 11/1999 | Kleinerman |
| 6,072,921 A | 6/2000 | Frederick |
| 6,075,628 A | 6/2000 | Fisher |
| 6,115,520 A | 9/2000 | Laskowski |
| 6,148,123 A | 11/2000 | Eslambolchi |
| 6,185,020 B1 | 2/2001 | Horiuchi et al. |
| 6,194,706 B1 | 2/2001 | Ressl |
| 6,195,162 B1 | 2/2001 | Varnham |
| 6,269,198 B1 | 7/2001 | Hodgson |
| 6,269,204 B1 | 7/2001 | Ishikawa |
| 6,285,806 B1 | 9/2001 | Kersey |
| 6,315,463 B1 | 11/2001 | Kropp |
| 6,381,011 B1 | 4/2002 | Nickelsberg |
| 6,459,486 B1 | 10/2002 | Udd et al. |
| 6,487,346 B2 | 11/2002 | Nothofer |
| 6,489,606 B1 | 12/2002 | Kersey et al. |
| 6,594,055 B2 | 7/2003 | Snawerdt |
| 6,625,083 B2 | 9/2003 | Vandenbroucke |
| 6,628,570 B2 | 9/2003 | Ruffa |
| 6,704,420 B1 | 3/2004 | Goedgebuer et al. |
| 6,788,417 B1 | 9/2004 | Zumberge |
| 6,813,403 B2 | 11/2004 | Tennyson |
| 6,859,419 B1 | 2/2005 | Blackmon |
| 6,943,872 B2 | 9/2005 | Endo et al. |
| 7,006,230 B2 | 2/2006 | Dorrer et al. |
| 7,110,677 B2 * | 9/2006 | Reingand et al. .............. 398/98 |
| 7,266,299 B1 | 9/2007 | Bock et al. |
| 7,397,568 B2 * | 7/2008 | Bryce et al. ................... 356/484 |
| 7,548,319 B2 | 6/2009 | Hartog |
| 7,656,535 B2 | 2/2010 | Healey et al. |
| 7,667,849 B2 | 2/2010 | Sikora et al. |
| 7,697,795 B2 | 4/2010 | Heatley et al. |
| 7,755,971 B2 | 7/2010 | Heatley et al. |
| 7,796,896 B2 | 9/2010 | Sikora et al. |
| 7,817,279 B2 | 10/2010 | Healey |
| 7,848,645 B2 | 12/2010 | Healey |
| 2001/0028766 A1 | 10/2001 | Hatami-Hanza |
| 2002/0196447 A1 | 12/2002 | Nakamura |
| 2003/0103211 A1 * | 6/2003 | Lange et al. .................. 356/479 |
| 2003/0117893 A1 | 6/2003 | Bary |
| 2003/0174924 A1 | 9/2003 | Tennyson |
| 2004/0027560 A1 | 2/2004 | Fredin |
| 2004/0113056 A1 | 6/2004 | Everall |
| 2004/0201476 A1 | 10/2004 | Howard |
| 2004/0208523 A1 | 10/2004 | Carrick et al. |
| 2004/0227949 A1 | 11/2004 | Dorrer et al. |
| 2006/0011840 A1 * | 1/2006 | Bryce et al. ................. 250/338.5 |
| 2006/0163457 A1 | 7/2006 | Katsifolis et al. |
| 2006/0256344 A1 | 11/2006 | Sikora |
| 2007/0009600 A1 | 1/2007 | Edgren |
| 2007/0065150 A1 | 3/2007 | Sikora |
| 2007/0127933 A1 | 6/2007 | Hoshida et al. |
| 2007/0264012 A1 | 11/2007 | Healey |
| 2008/0013161 A1 | 1/2008 | Tokura |
| 2008/0018908 A1 | 1/2008 | Healey |
| 2008/0123085 A1 | 5/2008 | Sikora |
| 2008/0166120 A1 | 7/2008 | Heatley |
| 2008/0219093 A1 | 9/2008 | Heatley |
| 2008/0219660 A1 | 9/2008 | Healey |
| 2008/0232242 A1 | 9/2008 | Healey et al. |
| 2008/0278711 A1 | 11/2008 | Sikora |
| 2009/0014634 A1 | 1/2009 | Sikora |
| 2009/0097844 A1 | 4/2009 | Healey |
| 2009/0103928 A1 | 4/2009 | Healey |
| 2009/0135428 A1 | 5/2009 | Healey |
| 2009/0252491 A1 | 10/2009 | Healey |
| 2009/0274456 A1 | 11/2009 | Healey et al. |

FOREIGN PATENT DOCUMENTS

| | | |
|---|---|---|
| EP | 0360449 | 3/1990 |
| EP | 0364093 | 4/1990 |
| EP | 0376449 | 4/1990 |
| EP | 0377549 | 7/1990 |
| EP | 0513381 | 11/1992 |
| EP | 0592690 | 4/1994 |
| EP | 0794414 | 9/1997 |
| EP | 0821224 | 1/1998 |
| EP | 0953830 | 11/1999 |
| EP | 1037410 | 9/2000 |
| EP | 1096273 | 5/2001 |
| EP | 1236985 | 9/2002 |
| EP | 1385022 | 1/2004 |
| EP | 1496723 | 1/2005 |
| FR | 2751746 | 1/1998 |
| GB | 2015844 | 9/1979 |
| GB | 2019561 | 10/1979 |
| GB | 2113417 | 8/1983 |

| | | |
|---|---|---|
| GB | 2126820 | 3/1984 |
| GB | 2205174 | 11/1988 |
| GB | 2219166 | 11/1989 |
| GB | 2262803 | 6/1993 |
| GB | 2264018 | 8/1993 |
| GB | 2401738 | 11/2004 |
| JP | 4115205 | 4/1992 |
| JP | 2001/194109 | 7/2001 |
| WO | WO 93/25866 | 12/1993 |
| WO | WO 97/05713 | 2/1997 |
| WO | WO 01/67806 | 9/2001 |
| WO | WO 02/065425 | 8/2002 |
| WO | WO 03/014674 | 2/2003 |
| WO | WO 2005/008443 | 1/2005 |
| WO | WO2005/095917 | 10/2005 |

OTHER PUBLICATIONS

Gupta et al., "Capacity Bounding of Coherence Multiplexed Local Area Networks Due to Interferometric Noise" *Iee Proc.* vol. 144, No. 2, Apr. 1997, pp. 69-74.
Liang "Modified White-Light Mach Zehnde Interferometer for Direct Group-Delay Measurements", *Applied Optics*, vol. 37, Issue 19, Jul. 1998, 1 page.
Jang et al., "Noncontact Detection on Ultrasonic Waves Using Fiber Optic Sagnac Interferometer", *IEEE Transactions*, vol. 49, No. 5, Jun. 2002, 9 pages.
Yilmaz et al. "Broadband Vibrating Quartz Pressure Sensors for Tsunameter and Other Oceanographic Applications", pp. 1-7 *Pacific Marine Environmental Laboratory, NOAA, Seattle, WA*.
Szustakowski et al., "Recent Development of Fiber Optic Sensors for Perimter Security", *IEEE Xplorer*, pp. 142-148.
"Fading Rates in Coherent OTDR", *IEEE Xplore*, vol. 20, No. 11, pp. 443-444.
Application and File History of U.S. Appl. No. 11/918,434, as available at www.uspto.gov.
Application and File History of U.S. Appl. No. 11/663,954, as available at www.uspto.gov.
Application and File History of U.S. Appl. No. 12/280,038, as available at www.uspto.gov.
Application and File History of U.S. Appl. No. 11/887,382, as available at www.uspto.gov.
Application and File History of U.S. Appl. No. 12/295,784, as available at www.uspto.gov.
Application and File History of U.S. Appl. No. 11/791,927, as available at www.uspto.gov.
Application and File History of U.S. Appl. No. 12/280,047, as available at www.uspto.gov.
Application and File History of U.S. Appl. No. 12/280,051, as available at www.uspto.gov.
Application and File History of U.S. Appl. No. 11/663,957, as available at www.uspto.gov.
Application and File History of U.S. Appl. No. 11/403,200, as available at www.uspto.gov.
Application and File History of U.S. Appl. No. 10/573,266, as available at www.uspto.gov.
Application and File History of U.S. Appl. No. 11/791,923, as available at www.uspto.gov.
Application and File History of U.S. Appl. No. 11/885,275, as available at www.uspto.gov.
Application and File History of U.S. Appl. No. 11/885,400, as available at www.uspto.gov.
Application and File History of U.S. Appl. No. 11/916,054, as available at www.uspto.gov.
European Search Report, Application No. 05733039.2-1524, dated Apr. 6, 2010, 7 pages.
State Intellectual Property Office of China, Text of First Office Action, Dated Aug. 15, 2008.
State Intellectual Property Office of China, Second Notification of Office Action, Application No. 200580009905.4, dated Mar. 27, 2009, 4 pages.
State Intellectual Property Office of China, Third Notification of Office Action, Application No. 200580009905.4, dated Jun. 19, 2009, 4 pages.
State Intellectual Property Office of China, Rejection Decision, Application No. 200580009905.4, Dated Dec. 4, 2009, 19 pages.
Application and File History of U.S. Appl. No. 11/918,434, Inventor: Healey, filed Oct. 12, 2007, as available at www.uspto.gov.
Application and File History of U.S. Appl. No. 11/663,954, Inventor: Sikora, filed Mar. 28, 2007, as available at www.uspto.gov.
Application and File History of U.S. Appl. No. 11/791,927, Inventor: Sikora, filed, May 31, 2007, as available at www.uspto.gov.
Application and File History of U.S. Appl. No. 11/887,382, Inventor: Healey, filed, Sep. 28, 2007, as available at www.uspto.gov.
Application and File History of U.S. Appl. No. 12/295,784, Inventor: Healey, filed, Oct. 2, 2008, as available at www.uspto.gov.
Application and File History of U.S. Appl. No. 12/280,038, Inventor: Healey, filed, Aug. 20, 2008, as available at www.uspto.gov.
Application and File History of U.S. Appl. No. 12/280,047, Inventor: Healey, filed, Aug. 20, 2008, as available at www.uspto.gov.
Application and File History of U.S. Appl. No. 12/280,051, Inventor: Healey, filed, Aug. 20, 2008, as available at www.uspto.gov.
Application and File History of U.S. Appl. No. 11/663,957, Inventor: Healey, filed, Mar. 28, 2007, as available at www.uspto.gov.
Application and File History of U.S. Appl. No. 11/403,200, Inventor: Sikora, filed, Apr. 13, 2006, as available at www.uspto.gov.
Application and File History of U.S. Appl. No. 10/573,266, Inventor: Sikora, filed, Mar. 23, 2006, as available at www.uspto.gov.
Application and File History of U.S. Appl. No. 11/791,923, Inventor: Healey, filed, May 31, 2007, as available at www.uspto.gov.
Application and File History of U.S. Appl. No. 11/885,275, Inventor: Healey, filed, Aug. 29, 2007, as available at www.uspto.gov.
Application and File History of U.S. Appl. No. 11/885,400, Inventor: Heatley, filed, Aug. 30, 2007, as available at www.uspto.gov.
Application and File History of U.S. Appl. No. 11/916,054, Inventor: Sikora, filed, Nov. 30, 2007, as available at www.uspto.gov.
State Intellectual Property Office of China, Rejection Decision, Application No. 200580009905.4, dated Dec. 4, 2009, 19 pages.
State Intellectual Property Office of China, Third Notification of Office Action, Application No. 200580009905.4 dated Jun. 19, 2009, 4 pages.
State Intellectual Property Office of China, Second Notification of Office Action, Application No. 200580009905.4 dated Mar. 27, 2009, 4 pages.
State Intellectual Property Office of China, Text of First Office Action, dated Aug. 15, 2008.
European Search Report, Application No. 05733029.2-1524, dated Apr. 6, 2010, 7 pages.
European Search Report, Application No. 05826466.4-2415, dated Jul. 27, 2010.
Japanese Office Action for Japanese Application No. 2007-505635 mailed Aug. 17, 2010.
Application and File History of U.S. Appl. No. 11/918,434, Inventor: Healey, filed Oct. 12, 2007, as available at www.uspto.gov.
Application and File History of U.S. Appl. No. 11/663,954, Inventor: Sikora, filed Mar. 28, 2007, as available at www.uspto.gov.
Application and File History of U.S. Appl. No. 11/791,927, Inventor: Sikora, filed Mar. 28, 2007, as available at www.uspto.gov.
Application and File History of U.S. Appl. No. 11/887,382, Inventor: Healey, filed, Sep. 28, 2007, as available at www.uspto.gov.
Application and File History of U.S. Appl. No. 12/295,784, Inventor: Healey, filed, Oct. 2, 2008, as available at www.uspto.gov.
Application and File History of U.S. Appl. No. 12/280,038, Inventor: Healey, filed, Aug. 20, 2008, as available at www.uspto.gov.
Application and File History of U.S. Appl. No. 12/280,047, Inventor: Healey, filed, Aug. 20, 2008, as available at www.uspto.gov.
Application and File History of U.S. Appl. No. 12/280,051, Inventor: Healey, filed, Aug. 20, 2008, as available at www.uspto.gov.
Application and File History of U.S. Appl. No. 11/663,957, Inventor: Healey, filed, Mar. 28, 2007, as available at www.uspto.gov.
Application and File History of U.S. Appl. No. 11/403,200, Inventor: Sikora, filed, Apr. 13, 2006, as available at www.uspto.gov.
Application and File History of U.S. Appl. No. 10/573,266, Inventor: Sikora, filed, Mar. 23, 2006, as available at www.uspto.gov.

Application and File History of U.S. Appl. No. 11/791,923, Inventor: Healey, filed, May 31, 2007, as available at www.uspto.gov.
Application and File History of U.S. Appl. No. 11/885,275, Inventor: Healey, filed, Aug. 29, 2007, as available at www.uspto.gov.
Application and File History of U.S. Appl. No. 11/885,400, Inventor: Heatley, filed, Aug. 30, 2007, as available at www.uspto.gov.

Application and File History of U.S. Appl. No. 11/916,054, Inventor: Sikora, filed, Nov. 30, 2007, as available at www.uspto.gov.
Japanese Office Action for Japanese Application No. 2007-505635 mailed Aug. 17, 2010.

* cited by examiner

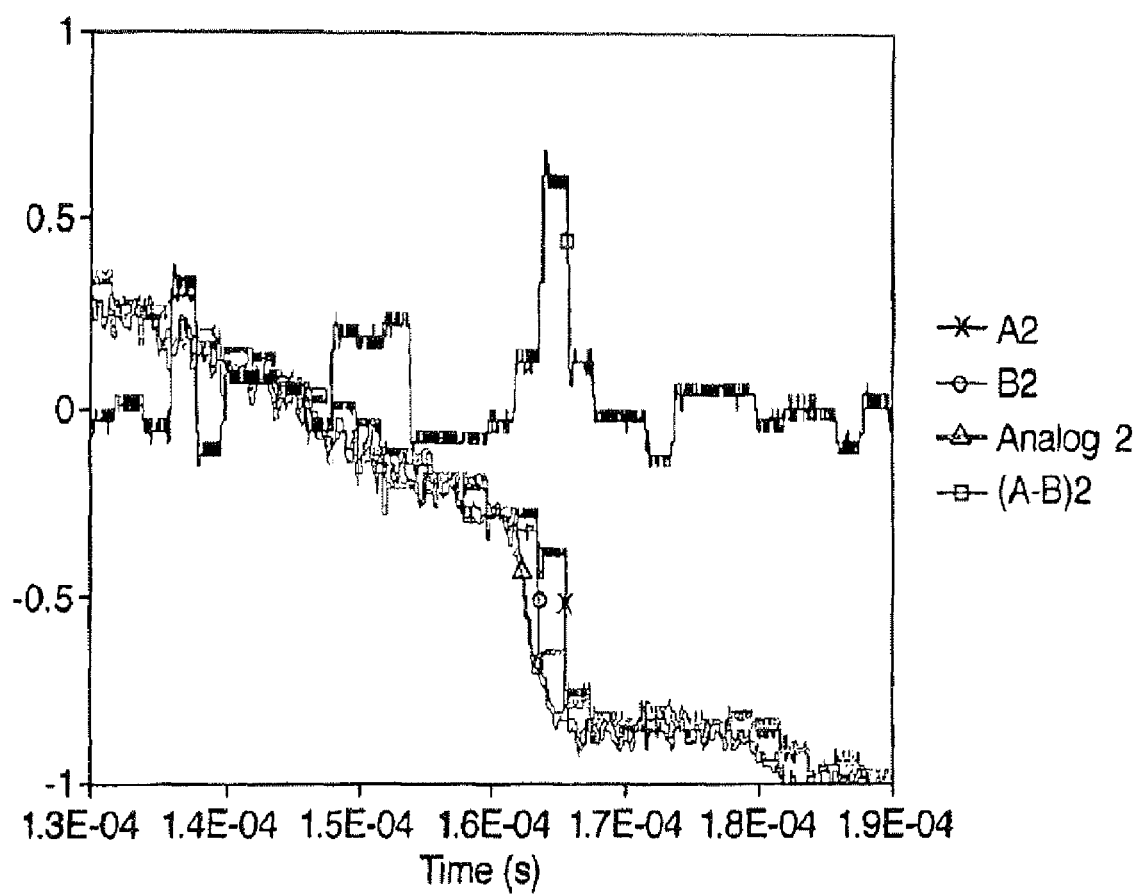

EVALUATING THE POSITION OF A DISTURBANCE

This application is the US national phase of international application PCT/GB2005/001269 filed 31 Mar. 2005 which designated the U.S. and claims benefit of GB 0407386.2, dated 31 Mar. 2004, the entire content of which is hereby incorporated by reference.

BACKGROUND

1. Technical Field

The present invention relates to a method of and apparatus for evaluating the position of a disturbance on a transmission link, in particular where the disturbance is a time-varying disturbance.

2. Related Art

It is known to estimate the position of an irregularity in a waveguide by launching a test pulse in the waveguide, and monitoring the distributed backscattering of the test pulse so as to detect an abnormality, if any, in the time-dependence of the returned signal. An example of an abnormality could be a step change in the time-dependent amplitude of a return signal. However, such known Optical Time Domain Reflectometry (OTDR) techniques are not well suited to detecting time-varying disturbances.

According to the present exemplary embodiment, there is provided a method of evaluating the position of a time-varying disturbance on a transmission link, the method including the steps of: copying, at least in part, an output signal from a source, such that there is a pair of signal copies; transmitting the signal copies onto the transmission link; receiving from the transmission link at least partially returned signal copies previously transmitted thereon; combining the received signal copies of a transmitted pair so as to produce a combination signal; and, using a temporal characteristic in the combination signal to evaluate the position of the disturbance on the communications link.

Because copies of the output signal are combined to produce a combination signal, any modification of at least one of these copies is likely to produce a change in the combination signal, thereby facilitating the evaluation of a time-varying disturbance.

Preferably, the transmission link will be an optical waveguide, such as an optical fibre. A dynamic or other time-varying disturbance of the link will normally be a physical disturbance, such as an acoustic or other vibration. A physical disturbance is likely to produced a strain or an elastic wave in the optical medium of the transmission link, thereby changing the phase of at least one of the signal copies travelling along the link. A dynamic disturbance may be stationary, that is, located at a stationary point. Alternatively, the dynamic disturbance may move along the optical waveguide.

Preferably, a signal will be returned by a process of distributed backscattering, for example Rayleigh backscattering, such that the signal is returned progressively as the signal propagates along the waveguide. This will normally give rise to a combination signal that is distributed over time. The combination signal will preferably be monitored to detect a disturbance feature therein, from which disturbance feature the presence of a disturbance may be inferred.

One example of a disturbance feature may be a change in the amplitude of the combination signal, for example a step change with respect to time. The combination signal may be displayed on a display devices as a function of time in the manner of a trace, allowing the occurrence of a disturbance to be visually inferred from the trace. However, the combination signal may be analysed to detect more subtle characteristics of a disturbance feature.

A temporal characteristic in the combination signal may be a return time associated with the disturbance feature, in particular the arrival time of returned signal copies (once combined) responsible for a disturbance feature, this time being the round-trip time for light propagating to and from the position of the physical disturbance. In one embodiment, a pulse form the source will give rise to a time distributed combination signal, and the combination signal will be monitored as a function of the elapsed time from a reference time, which reference time will be related to the time at which the pulse is generated.

The output signals from a source will preferably have an irregular component, in which case the step of copying at least in part the output signal from the source will preferably result in that the irregular component is common to each of the signal copies of a pair. Other characteristics of the signal need not be the same in each signal copy: for example, the signal copies may have different amplitudes. The irregular component will preferably be random, or pseudo random (by pseudo random; it is meant that although in theory a component is possible to predict, the time or processing power required to do this will make it in practice impossible to predict). If the output signal has a waveform, the irregular component may be provided by the phase of the waveform if the waveform has randomly occurring phase changes. The waveform may conveniently be provided by an optical source having a short coherence time, preferably less than 10 pico seconds or even less than 1 pico second. The combination signal will preferably be an interference signal resulting from the interference or mixing of two waveforms.

Preferably, the signal copies will be transmitted along the transmissions link with a time delay relative to one another, such that there is a leading copy and a trailing copy. The returned leading copy can then be delayed relative to the previously trailing copy, such that both copies can be combined substantially in step with one another.

In a preferred embodiment, this is achieved using an interferometer stage, such as an unbalanced Mach Zehnder interferometer. In this preferred embodiment, the output from the optical source is fed to the interferometer, where the signal is copied, one copy being channelled to one path of the interferometer, the transit time associated with each path being different, such that a relative or differential delay results between the time at which the signal copies are transmitted from the interferometer stage. The same interferometer stage can then be employed to re-align the returned signal copies in a particularly convenient manner, since the relative delay imposed in the outbound direction will be the same as the relative delay imposed in the return direction, this being in each case determined by the difference in the transit times of the two paths.

The differential delay will preferably be chosen in dependence at least in part on the average coherence time of the source. The differential delay will preferably be much longer than the coherence time. Preferably, the ratio of the differential delay to the coherence time will be greater or equal to $10^3$ yet more preferably $10^5$ or even yet more preferably $10^7$.

The steps of copying output signals and transmitting the signals will preferably be carried out at a first location, a disturbance remaining detectable at distance of at least 1 km or even at least 10 km from the first location.

The transmission link may include an optical channel extending along a guide track, the guide track being arranged to guide the movement of a moving vehicle. In this way, the transmission link may be used to monitor the movement of a vehicle guided to move along the transmission link.

Preferably, the optical channel will be in a mechanically coupled relationship to the track, such that movement of the vehicle causes a disturbance along the optical channel. The optical channel need not be directly coupled to the track, and may be indirectly coupled for example through the ground. For example, the optical channel may simply lie on the ground next to the track or in a duct, without necessarily being secured. However, because of the mechanical coupling, vibrations or other disturbances such as acoustic disturbances generated by the movement of the vehicle along the track may cause a corresponding (albeit attenuated or modified) disturbance in the transmissions link, which disturbance will move along the link in a continuous fashion at the same speed as the vehicle.

Because the acoustic coupling to the optical channel need not (but may) be enhanced at specific coupling points, and because instead the continuous coupling provided by the medium between the track and the channel will normally be sufficient, an optical channel provided by an existing track-side fibre cable may conveniently be used. Alternatively, a new cabled installed in an existing track-side duct may be employed.

The guide track will preferably have the form of one or more rails, which rails will normally guide the movement of a train. This arrangement is particularly convenient because the vibrations generated by train are likely to be significant, thereby making the position of such a vehicle easier to detect.

BRIEF DESCRIPTION OF THE DRAWINGS

Further aspects of the invention are provided in the appended claims. The present invention will now be described in further detail below, by way of example only, with reference to the following drawing in which:

FIGS. 6a-6c show measured traces of sampled return signals;

DETAILED DESCRIPTION OF EXEMPLARY EMBODIMENTS

Estimating the Position of a Disturbance

Figure 1:
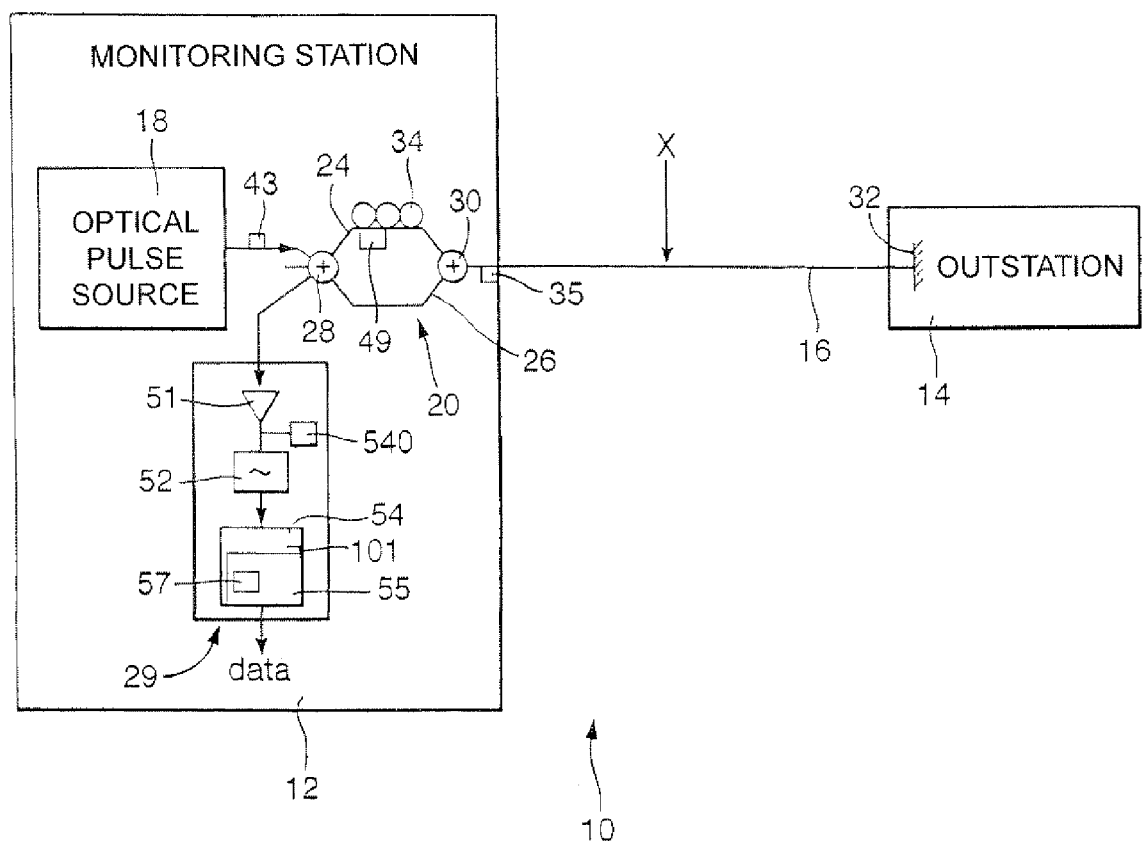
FIG. 1 shows on optical sensing system with a transmission link, according to the present invention.

The monitoring station 12 includes an optical pulse source 18 with a short coherence time (random phase changes in the output providing an irregular component to the signal), the pulse source being driven by a driver unit. Pulses from the optical source 18 are fed to an interferometer stage 20, here a Mach Zhender interferometer with a first path 24 and a second path 26, the paths 24, 26 being coupled at each end by a respective first and second coupling stage 28, 30. For light travelling in the outbound direction, the first coupling stage 28 acts as a directional power (intensity) splitter, channeling light from the optical source 18 to each of the paths 24, 26, the power to each path being shared in a predetermined manner (here, the first coupling stage acts as a 50:50 power splitter, although a different ratio could be used).

The monitoring station 12 includes an optical pulse source 18 with a short coherence time (random phase changes in the output providing an irregular component to the signal), the pulse source being driven by a driver unit 118. Pulses from the optical source 18 are fed to an interferometer stage 20, here a Mach Zehnder interferometer with a first path 24 and a second path 26, the paths 24, 26 being coupled at each end by a respective first and second coupling stage 28, 30. For light travelling in the outbound direction, the first coupling stage 28 acts as a directional power (intensity) splitter, channelling light from the optical source 18 to each of the paths 24, 26, the power to each path being shared in a predetermined manner (here, the first coupling stage acts as a 50:50 power splitter, although a different ratio could be used).

Thus, for each pulse provided by the optical source 18, that pulse is copied such that there is a first copy and a second copy, the first and second copies being in this example duplicates of one another. One copy travels along the first path 24 whilst the other copy travels along the second path 26. The second coupling stage 30 is coupled to an output 35 of the interferometer, which output is connected to the fibre 16. The second coupling stage 30 acts as a combiner for light travelling in the outbound direction, channelling light from the first and second paths to the interferometer output 35. The first path of the interferometer has a delay stage 34 for increasing the transit time of light travelling therealong between the first and second coupling stages 28, 30, the transit time for light travelling between the coupling stages 28, 30 being greater along the first path 24 than along the second path 26. Thus, for each pulse produced by the optical source, the interferometer 20 serves to delay one of the pulse copies relative to the other pulse copy by a delay time D, pulse copies being transmitted onto the optical fibre network 16 at different times to one another.

For signals travelling in the return direction, the second coupling stage 30 act as a power splitter, in a similar fashion to the action of the first coupling stage 28 on light in the forward direction (from the optical source 18). In this way, the intensity of return signals is split at the second coupling stage 30, one portion being channelled along the first path 24, whilst the other portion is channelled along the second path 26. The first coupling stage 28 then serves to combine light from the first and second paths in the return direction, channelling the combined light as an interference (combination) signal to a signal processing system 29 coupled to an output of the first coupling stage 28.

The signal processing system includes: a photo-receiver 51 coupled to the first coupling stage 28 for converting optical signals into electrical signals; a filter 52 for receiving electrical signals from the photo-receiver 51 and filtering the electrical signals; a first signal processing unit 54 for processing the filtered electrical signals; and an optional further processing unit for performing more detailed processing of the electrical signals. The filter 52 bandwidth (about 1 MHz) is matched to the expected signal bandwidth in order to minimise extraneous noise.

Figure 4:
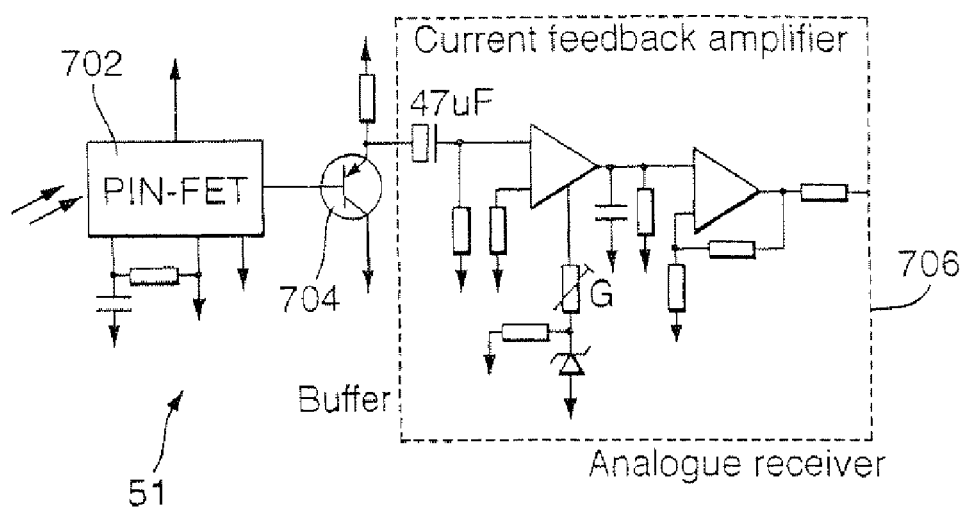
FIG. 4 shows a photo receiver circuit.

The photo receiver 51 is shown in more detail in FIG. 4. Light from the coupler 28 is incident on a photo transistor

702, here a PIN-FET, which produces an electrical output that is fed to a bipolar transistor 704, acting as a buffer, before being fed to a variable gain current feedback amplifier 706. The light source 18 may be a Light Emitting Diode, a source of amplified spontaneous emission such as an Erbium-Doped Fibre Amplifier, a Semiconductor Optical Amplifier, or a Super Luminescent Diode since this has a broad and smooth power spectrum and a short coherence time of about 0.5 ps or less. However, a Fabry-Perot Laser Diode is preferred, as described later with reference to FIGS. 5*a* and 5*b*.

The radiation produced by the optical source may be unpolarised, or alternatively a de-polarising unit 43 may be provided between the light source and the interferometer, for depolarising the light before the light is injected into the interferometer (the de-polarising unit may be for example, a Fibre Lyot de-polariser). A polarisation controller or de-polariser 49 may be provided in one of the paths of the interferometer, here, the first path, so that the polarisation of light from the first path combining in the return direction at the first coupler 28 is at least partially aligned with that of the light from the other path. A de-polariser also has the advantage of effectively scrambling any polarisation structure in the returning backscatter signal making it much easier to detect loss defects.

Typically, the source will operate at a wavelength of between 1 micron and 2 microns, preferably around 1.3 or 1.55 microns, in order to efficiently make use of standard telecommunications optical fibre, such fibre being configured to support single mode transmission at this wavelength. Typically, the fibre will have a single core of a diameter which is around 9 or 10 microns.

The operation of the monitoring station 12 can best be understood by considering return components of outbound pulse copies returned from a particular point on a fibre. For each pulse generated by the source 18, there will be four resulting signals: a non-retarded signal S0 which has traveled along the second path 26 of the interferometer 20 in both the forward and reverse directions: a first retarded signal S1 delayed by a delay D in the forward direction (but not the reverse direction): a second retarded signal S2 retarded by the delay D in the reverse direction (but nor the forward direction): and, a twice-retarded signal S3 retarded by a delay 2D, signal S3 being retarded in each of the forward and reverse directions.

The first and second retarded signals S1, S2 which are retarded in one direction only will be returned to the first coupling stage 28 at the same time. In the absence of any disturbance in the fibre 16, these signals are copies of one another (i.e. have the same phase or phase changes) and the signals will interfere or otherwise combine constructively at the first coupling stage 28. However, if one of the pair of the signals S1, S2 is modified relative to the other of the pair (as is likely to happen with a dynamic disturbance), the signals S1, S2 will no longer interfere constructively. This will result in a change in the interference signal from the first coupling stage. In particular, a relative phase change in the signals S1, S2 will result in an amplitude change of the interference signal at an output of the first coupling stage.

A phase change on light travelling through the fibre will normally be effected by a physical disturbance. This is because a physical disturbance (caused for example by a displacement, an acoustic or ultrasound wave or other vibration) is likely to result in a change in the transmission properties of an optical fibre or other optical link. In particular, a physical disturbance such as that cause by a shock is likely to result in a time varying strain which will change the optical path length in the strained region of the light-carrying medium of the fibre (normally the silica glass core of the fibre), either through a change in the refractive index, polarisation, or a change in the physical length, or a combination of these.

Figure 8A:
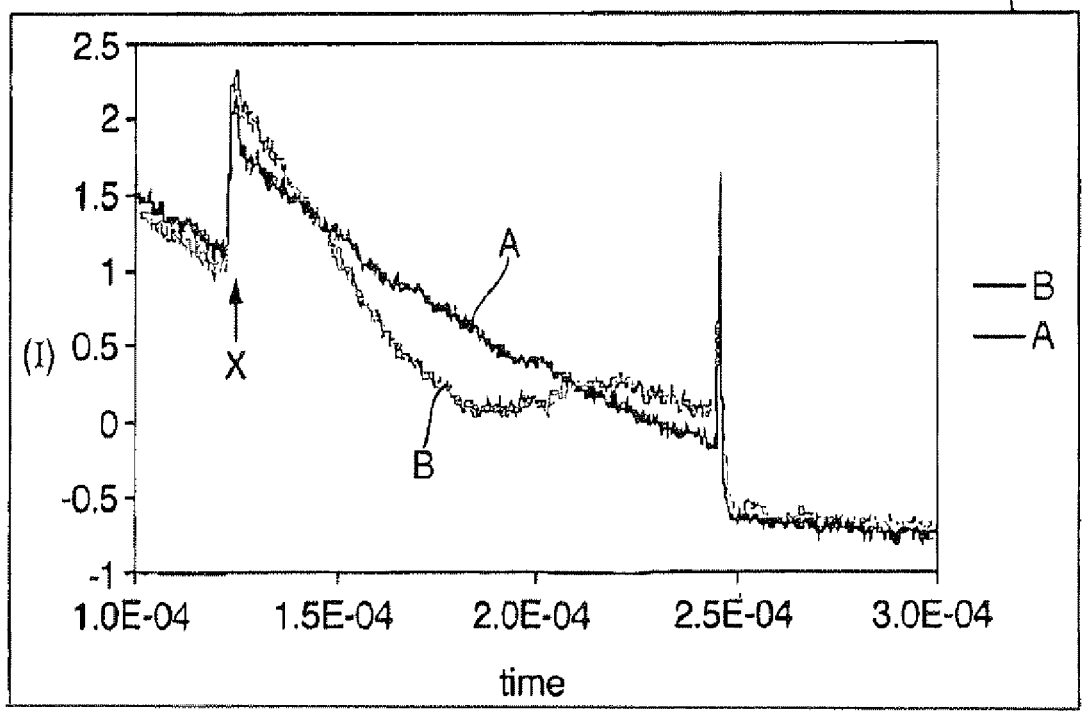
FIG. 8a shows a measured return signal.

For each pulse produced by the source, the interference signal will be distributed over a time corresponding to the transit time of the pulse copies along the fibre. Trace A of FIG. 8*a* shows how the interference signal (I) resulting from a transmitted pulse varies with elapsed time from the transmission of the pulse from the source (trace B is for a stronger disturbance). Here, each point along the trace corresponds to a position along the fibre at which the signal responsible has been returned.

Initially, the pulse copies will have suffered little attenuation through backscattering or loss. Therefore the intensity of the backscattered components, which is related to the intensity of the pulses, is high and the interference signal is also high. As the pulse copies travel along the fibre, the pulses are attenuated, as well as the backscattered components, with the result that the interference signal diminishes with time.

After a time t1, returned backscattered components will have originated from pulses which have traveled beyond the position X. When the pulse copies or the backscattered components pass through position X, the phase of the backscattered components resulting from the pulse copies will be affected by the disturbance. Because the disturbance changes with time, the relative phase of the backscattered components of a given pair of pulse will be changed, resulting in a sharp change in the interference signal at the time t1. Likewise, returned components from the pulses which have traveled beyond X will also be affected. Hence the trace remains shifted after time t1 in a step-like fashion. Since the time t1 corresponds to the round trip time to the first sensing location and back, the distance along the fibre path of the point X can be inferred from the value of t1 (or the value t1 relative to a reference time which includes an offset, for example the offset due to the delay line 34 of the interferometer).

In order to view the trace of FIG. 8*a*, the processing unit 54 includes a processor/memory circuit 55. The processor/memory circuit is connected to the driver of the optical source 18, for accessing the electrical pulse signals which drive the source 18. The processor/memory circuit includes a timer unit 57 which indicates the elapsed time after the transmission of each pulse from the source, the timer unit being configured to reset using the pulse signals when a new optical pulse is launched. The processor/memory circuit 55 is connected to the bandpass amplifier 51 so as to receive the interference signal in the electrical domain, and to store the signal from each pulse as a function of elapsed time from the generation of the pulse. To store the interference signal as a function of time, the processor/memory circuit 55 is configured to sample the interference signal at intervals, and to store each sample with the associated return time. The stored interference signal can then be viewed on a viewing device 101. However, the interference signal may be stored temporarily, for example, through the remnants of a cathode display.

The pulses from the source will be transmitted in a repetitive fashion, preferably every 1 ms, the duration of each pulse being 1 µs. Alternatively, for a higher resolution, the pulses may be 0.5 µs long.

The delay line will preferably be at least 20 km since for shorter length and when a disturbance is small (i.e., such that the fibre phase changes respond linearly), the interferometer system becomes less sensitive when the disturbance frequency is low. With a delay line of about 20 km (which corresponds to a delay of about 100 µs), the pulse (signal) copies will be spatially distinct as they travel along the fibre, since the pulses are typically of 1 μs duration, sent every 1 ms. However, for longer pulses, or a shorter delay, signal copies may overlie one another. For a continuous signal, a signals will not each be a discrete entities, since consecutive signals will be joined seamlessly as a continuous waveform.

In one embodiment, the occurrence of a disturbance is first detected using a continuous optical signal, reflected from a mirrored end surface 32 of the fibre, located at an outstation 14. Essentially, the apparatus of FIG. 1 can be used but with a source that produces a continuous signal rather than pulses. The signal is returned from the outstation, and recombined at the interferometer in a similar fashion to the pulses. However, with a continuous signal a bandpass amplifier 52 can be used that has a lower bandwidth (about 100 kHz) than that required for backscattered pulses, with the result that the interference signal will be less noisy, thereby allowing for a more sensitive detection of disturbances. Furthermore, with a continuous signal, the returned signal can be integrated over a time period, since positional resolution is not needed for the detection of a disturbance. Once a disturbance has been detected, its position can be established as explained above. Nevertheless, as is clear from FIG. 8a, it is possible to determine the occurrence itself of a disturbance using a pulse rather than a continuous signal.

Figure 2:
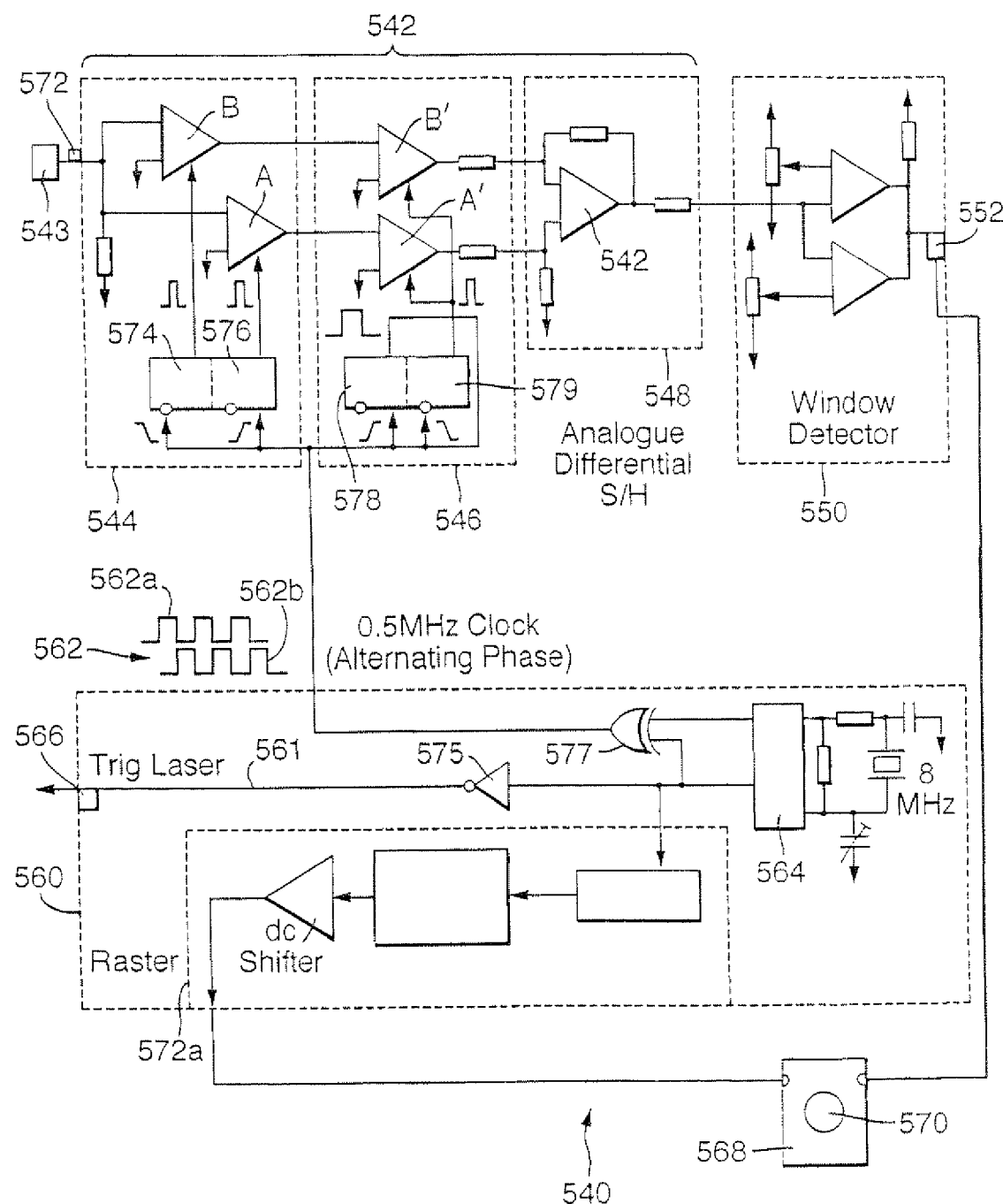
FIG. 2 shows a signal processing circuit for use with the system of FIG. 1.

FIG. 2 shows a further signal processing unit 540. In a similar fashion to the first signal processing unit 54, the further signal processing unit 540 is suitable for evaluating, on the basis of Optical Time Domain Reflectometry (OTDR), the distance of one or more disturbances along the link 16. Although in FIG. 1 the further signal processing unit 540 is shown as an additional unit to the first processing unit 54, in practice just the further processing unit 540 may be implemented at the monitoring station.

In general terms, the further signal processing unit 540 is configured to process the interference signal originating from a first location using the interference originating from a second location, the second location being positioned upstream of (that is, nearer the monitoring station than) the first location. In practise, this is done by sampling the return signal at a first time and at a second time, and evaluating the difference between the two sampled signals. This approach recognises that the interference signal from the first location may include contributions from the second location, since the pulses (and returned components thereof) will pass through the first location to reach the second location. To avoid unnecessary processing, each location is associated with a resolution cell (determined by the pulse temporal width), the first and second locations corresponding to adjacent resolution cells. The difference between the interference signal from adjacent resolution cells along the length of the fibre can be evaluated in this way.

The signal processing unit 540 includes a sampling unit 542, here an analogue differential sample and hold circuit, which circuit is connected to the filter 52 at an input 543. The sampling unit 542 is configured to sample the incoming signals from the MZ coupler 28, in particular from the filter 52 which in turn receives signals from the photo receiver 51. The sampling unit 542 includes: a sampling stage 544 configured to sample the incoming signals at spaced apart time positions; and alignment stage 546 for aligning the signals previously sampled at spaced apart positions; and, a comparison stage 548 for comparing the re-aligned signals, in particular for evaluating the difference between the signals. Signals from the comparison stage 548 are passed to a window detector circuit 550, configured to generate an output at a signal output 552, in particular if the output signal from the comparison stage 548 departs from a centre value by more than a threshold value.

A timing control circuit 560 is included for providing trigger signals 561 for triggering the driver unit of the optical source 18 such that the source emits a pulse in response to each trigger signal. The timing control circuit 560 also generates clock pulses 562 which clock pulses control the operation of the sampling unit, in particular the sampling stage 544 and 546. The trigger signals 561 and the clock pulses 562 are generated by a common timing source 564, which may for example be a clock circuit. The trigger signals 561 may be tapped at a trigger output 566 and are fed to the trigger of an oscilloscope 568. The signal output 552 can then be fed to a signal input of the oscilloscope 568, which is preferably a storage oscilloscope, and viewed on a display 570. A raster circuit 572a may be provided to generate a raster signal which can be fed to the oscilloscope for generating a two-dimensional display. Further gates 575 and 577 are included in the timing control circuit as indicated in FIG. 2.

The clock pulses in the present example are at a frequency of 0.5 MHz and are of the alternating phase type, that is, a wave train is generated with one phase 562a, and another train is generated at a phase shift of 180 degrees. The timing control circuit is configured such that the clock phase alternates on every trigger pulse to the optical source 18, and also synchronises the raster generator for generating the two-dimensional display. The two-dimensional representation will allow the time-evolution of the backscatter signal from each position in the fibre to be observed on the display 570 of the storage oscilloscope 568. The digital and analogue electronics used separate, regulated and de-coupled power supplies (in FIG. 3, upward pointing arrow indicates a connection to a positive supply rail, whilst downward pointing arrows show a connection to ground or the negative supply rail).

In more detail, the sampling unit 542 includes a copying stage 572, which could be a simple "T" connector, for generating copies of the input signal (that is, the OTDR signal or a signal equivalent to the interference signal in the electrical domain). The sampling stage 544 has two sampling amplifiers A, B, each of which are triggered to sample by a respective pulse unit 574, 576, the pulse units being fed with clock pulses from the timing control circuit 560. The copies A and B each respectively enter amplifiers A, B, where respective discreet-time pulse amplitude copies are generated. The pulse units 574, 576 are arranged such that the sampling instance of the two copies (A and B) is offset by a range resolution interval, here one microsecond. The signals from sampling amplifiers A, B are then passed respectively to further sampling amplifiers A' and B' of the alignment stage 546, where these samples are then re-sampled.

The further sampling amplifiers A', B' or equivalently sampling gates are triggered by respective pulse units 578, 579 (the pulse units 578, 579 being driven by clock pulses from the timing control unit 560). The further amplifiers A', B' are operated in such a way (through the timing of the pulse units 578, 579) that the re-sampled signals of the A copy precede the sampled signals of the B copy: this means that the A samples originate from a range resolution cell which immediately precedes that of the B signal. The result of this re-sampling strategy is that sampling points "walk" along the fibre link 16 (separated by a distance corresponding to one microsecond), but with a step size of two microseconds (assuming the pulse initially transmitted by the optical source onto the fibre link 16 are one microsecond in duration).

The comparison stage 548 includes a difference amplifier 549 for evaluating the difference between the twice sampled signals A and B: that is, the output of the difference amplifier gives an output related to A–B. Because the A and B traces are re-aligned before being compared, it may be considered that the a values related to slope or gradient of the time-dependence of the signals is obtained. Effectively, the time-dependent sampled signals are differentiated: that is the difference between neighbouring samples is evaluated (although the samples need not necessarily be immediately neighbouring samples).

Figure 5A:
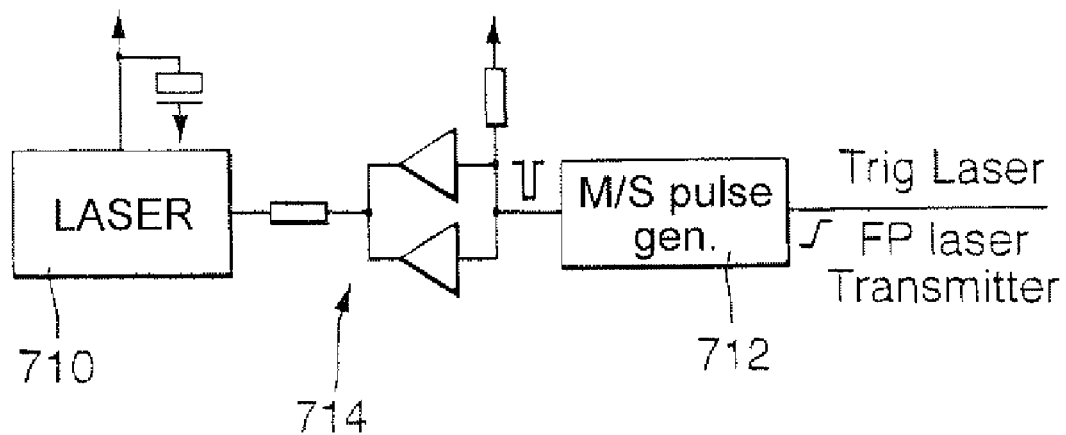
FIG. 5a shows an optical source circuit.
Figure 5B:
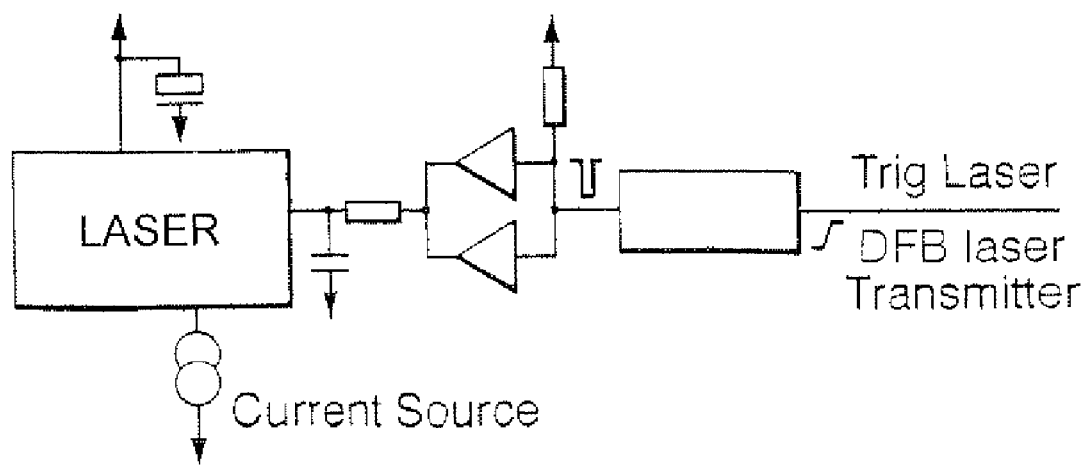
FIG. 5b shows another, less preferred optical source circuit.

The photo receiver 51 is shown in more detail in FIG. 4. Light from the coupler 28 is incident on a photo transistor 702, here a PIN-FET, which produces an electrical output that is fed to a bipolar transistor 704, acting as a buffer, before being fed to a variable gain current feedback amplifier 706. In FIG. 5a, a preferred optical source 18 is shown in more detail. Light for transmission onto the link 16 (through the interferometer stage) is generated by a Fabry Perot Laser 710. The trigger signal 561 from the timing control circuit 560 is received at a mono stable pulse generating unit 712, which generates a pulse for each trigger signal received, this pulse being amplified by a booster amplifier 714 so as to drive the laser 710. FIG. 5b shows an alternative in which a DFB laser is used. However, it has been found that a DFB laser can give rise to coherence noise, and Instability.

Figure 6A:
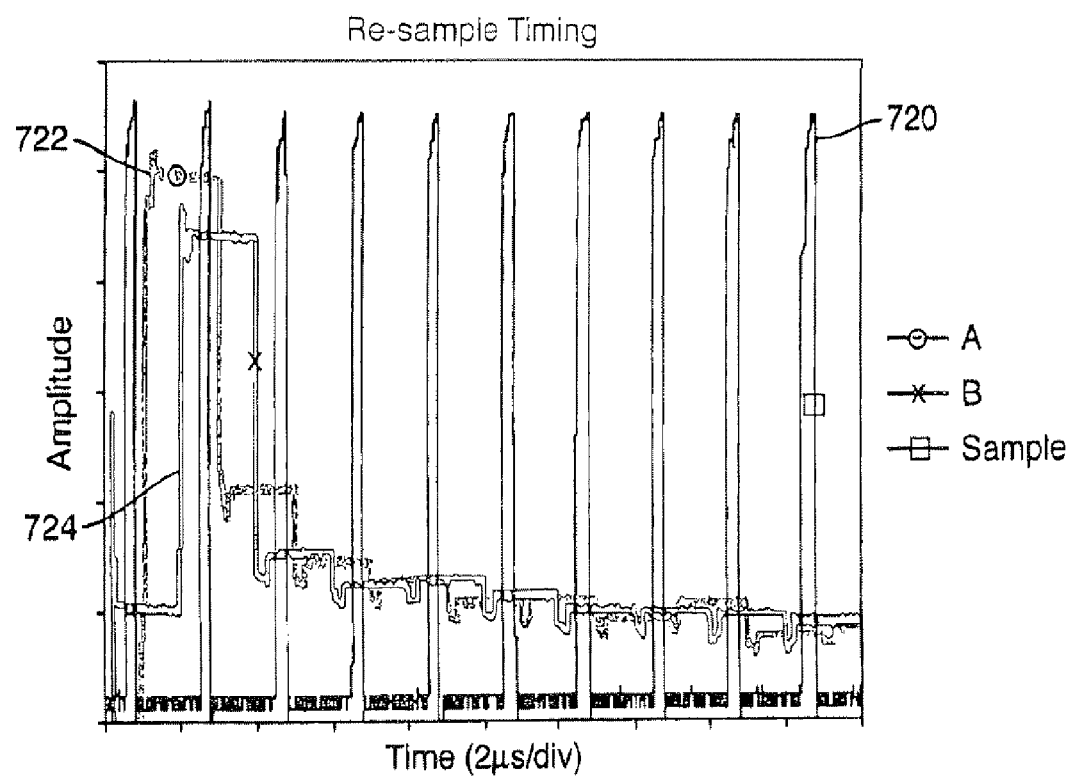
Figure 6B:
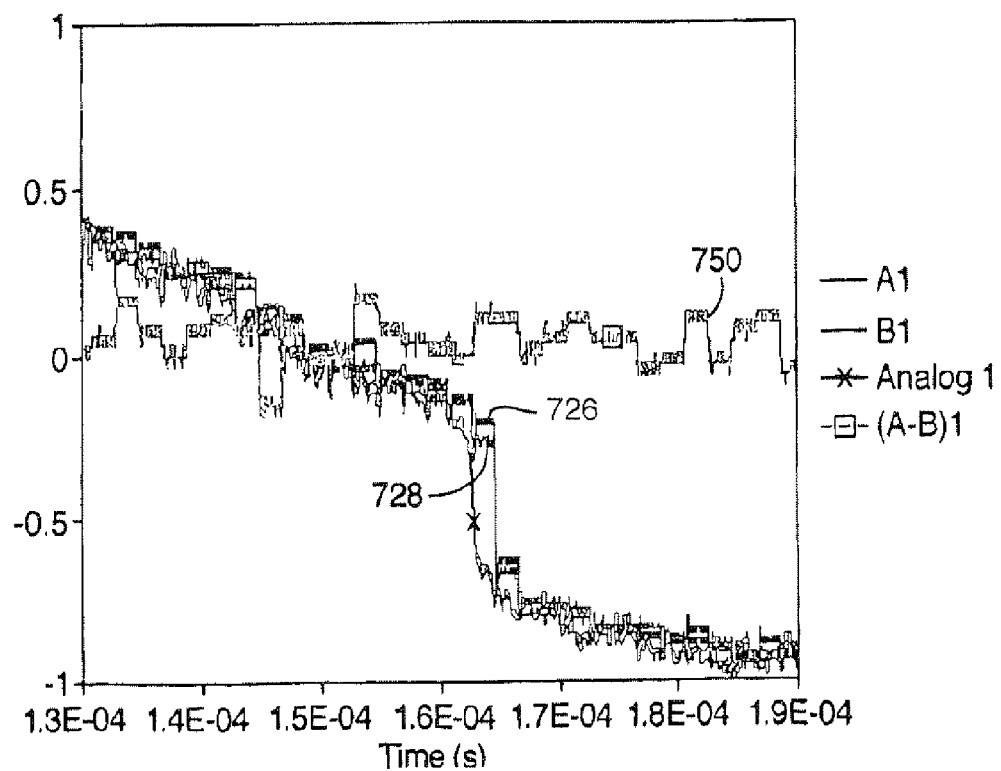

FIGS. 6a, 6b, and 6c show the sampling waveforms at various points in the signal processing unit 540. FIG. 6a shows the position of the regular (re)sampling pulses relative to the pulse amplitude modulated sampled waveforms A and B. In FIG. 6a, repeating sample pulses 720 are shown (darkest line). The A sampled signal (the output from amplifier A) is shown in the grey line 722, whilst the B sampled signals (that is, the output from the amplifier B) are shown by the lighter line 724. As can be seen from the "A" trace, the amplitude of the backscattered signal decreases as the elapsed time (since the launch of a test pulse from the optical source) increases, as is normally expected in OTDR. The amplitude of the "B" trace 724 likewise decreases with the elapsed time, but is shifted relative to the A trace.

In FIG. 6b the re-sampled signals A and B (that is, outputs from sampling amplifiers A' and B') are shown, the A sample being the darker trace 726 whilst the B sample is the lighter trace 728. Because the two signals have been re-sampled, as explained above, these are now aligned. The difference between the A and B re-sampled signals (that is, the output (A–B) from the comparison stage 548) is shown by the lighter trace 730. Although there are no apparent features indicating a disturbance in this trace, the (A–B) trace of FIG. 6c clearly shows a feature at about 165 microseconds (the time corresponding to the step change in curves A and B). The difference between the traces of FIGS. 6b and 6c is that the clock signals driving the sampling amplifiers has zero phase shifts in FIG. 6b, but a 180 degrees phase shift in FIG. 6c. This illustrates how by generating a first (A–B) trace with a clock signal at one phase, and another (A–B) trace with the clock at a phase offset by 180 degrees, gaps between the sampling cells in one trace can be effectively removed by sampling in cells which are shifted by one cell length. In this way, the resolution of the present embodiment is one microsecond, corresponding to a length of the order of 100 meters. Thus, the resolution length is equivalent to the pulse length of the test signals from the optical source 18.

Sensing a Data-Carrying Optical Link

Figure 3:
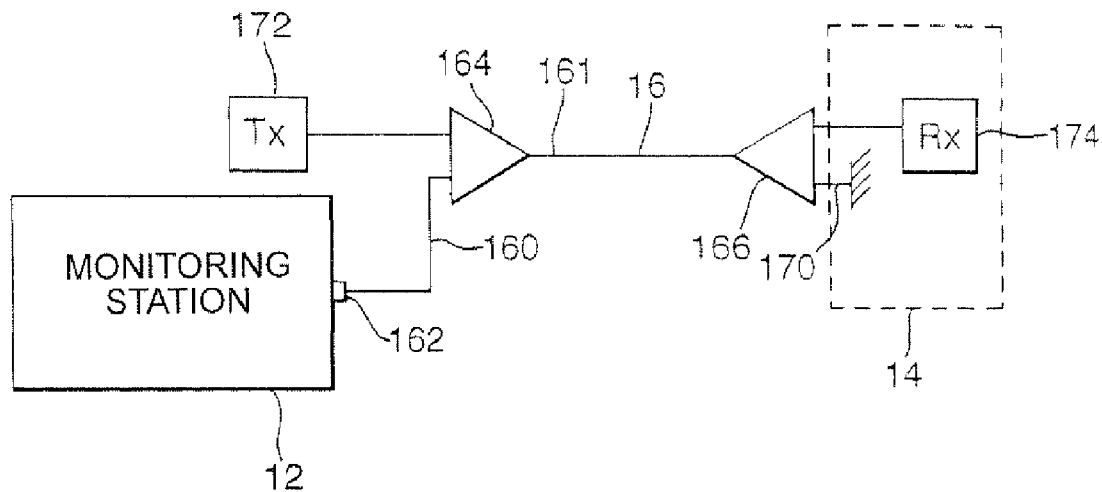
FIG. 3 shows how data can be multiplexed onto the link of FIG. 1.

FIG. 3 shows how the optical fibre of FIG. 1 or other transmission link 16 may carry data in a wavelength division multiplexed fashion. The transmission link 16 is coupled to the monitoring station 12 at a connector 162 by a coupling fibre 160 leading to a sensing portion 161 of the transmission link. Radiation from the coupling fibres 160 is introduced into the link 16 by a first wavelength coupler 164 at the input end of the link 16 (i.e., the monitoring side), whilst at the output end of the link 16 (away from the monitoring side), there is provided a second wavelength coupler 166, such that light from the link 16 can be coupled to an end reflector 168 located at the end of a termination fibre 170, the termination fibre 170 connecting the second wavelength coupler 166 to the reflector 168. A transmitter station 172 and a receiver station 174 are respectively connected to the first and second wavelength couplers 164, 166.

The wavelength couplers 164, 166 are each configured such that using a wavelength division multiplexing technique, data can be transmitted over the link 16 between the transmitter and receiver stations 172, 174 at one wavelength, whilst radiation from the monitoring station 12 is carried at another wavelength over the fibre link 16, radiation from the transmitter station 172 and the monitoring station 12 being transmitted over a common fibre or medium within the link 16.

At the second wavelength coupler 166, light at the wavelength of the source 18 is directed from the link 16 and to the termination fibre 170, where, upon reflection at the reflector 168, the radiation is reflected and returned into the link 16, for return transmission to the monitoring station. In this way, communication can take place along the link 16, whilst the link is being monitored, without unduly affecting the communication (although a disturbance along the fibre path formed by the coupling fibre 160, the fibre link 16 and the termination fibre 170 may be detected). In an alternative embodiment, the communications link 16 is a cable having a plurality of optical fibres, although the coupling fibre onto which signal streams are launched from the interferometer 20 will preferably be a single fibre. In such a situation, the coupling fibre 160 will simply be coupled to one of the transmission fibres of the link 16, which fibre will be coupled at an opposing end to the reflector 168. Thus, signals between the transmitting station 172 and the receiving station 174 can still be carried over the other transmission fibres, a disturbance in the monitored fibre being indicative of a disturbance in the cable.

As can be seen from the above description, a fibre that is being used for communication can be monitored whilst communication traffic is being carried by the fibre. A person attempting to eavesdrop on the fibre is likely to cause a physical disturbance by handling the fibre. If a disturbance occurs, the position of the disturbance along the fibre can be evaluated, allowing the eavesdropper to be located. It is thus possible to provide a secure transmission path for data transmission.

Theoretical Details

The following explains the theory behind at least some aspects of the above embodiment, based, at least in part, on scalar interferometer OTDR Theory. The theoretical operation of the interferometer OTDR using a pulsed probe signal to excite a distributed Rayleigh backscatter signal in order to give disturbance position information is rather involved. The problem is best understood by first considering a discrete reflector and a continuous wave excitation signal.

For a 'point' disturbance of the form $m(t) \approx \exp(-j\phi_m(t))$. Under cw excitation, it can be shown that the "ac" term at the output of the sensor is given by . . . .

$$z_{ac}(t) \propto 2 \cdot \cos\left[\phi_m(t-\tau) + \phi_m(t-2T+\tau) - \phi_m(t-\tau-D) - \phi_m(t-2T+\tau-D)\right] \quad (1)$$

where, T is the time of flight of the reflection point from the start of the fibre under test, and τ is the time of flight to the point of the disturbance. D is the unbalanced delay in the interferometer.

If we consider a sinusoidal modulating disturbance of the form $\phi_m(t)=a \cdot \text{Sin}(\omega_m t)$, then equation (1) becomes . . . .

$$z_{ac}(t) \propto \text{Cos}\left[\begin{array}{c} 4 \cdot a \cdot \text{Sin}\left\{\frac{\omega_m D}{2}\right\} \cdot \\ \text{Cos}\{\varpi_m(T-\tau)\} \cdot \text{Cos}\left\{\varpi_m\left(t-T-\frac{D}{2}\right)\right\} \end{array}\right] \quad (2a)$$

which can be put in the form . . . .

$$z_{ac}(t) \propto \text{Cos}\,[R_2 \cdot \text{Sin}(\overline{\omega}_m t - \psi_2)] \quad (2b)$$

This is a classical result for angle variation and can be evaluated using Bessel functions of the first kind. The angle variation depth $R_2$ is a function of the amplitude a, position τ, and the frequency $\omega_m$, of the disturbance and given by $$R_2 = 4 \cdot a \cdot \text{Sin}\left\{\frac{\omega_m D}{2}\right\} \cdot \text{Cos}\{\varpi_m(T-\tau)\}. \quad (2c)$$

From (2c), it follows that the variation depth will undergo minima and maxima at the following points in time and frequency . . . .
Min when $$f_m = \frac{n}{D}, \frac{2n-1}{4(T-\tau)};$$

Max when $$f_m = \frac{2n-1}{2D}, \frac{n}{2(T-\tau)}$$

where n is an integer in the range [−∞,∞].

Figure 7A:
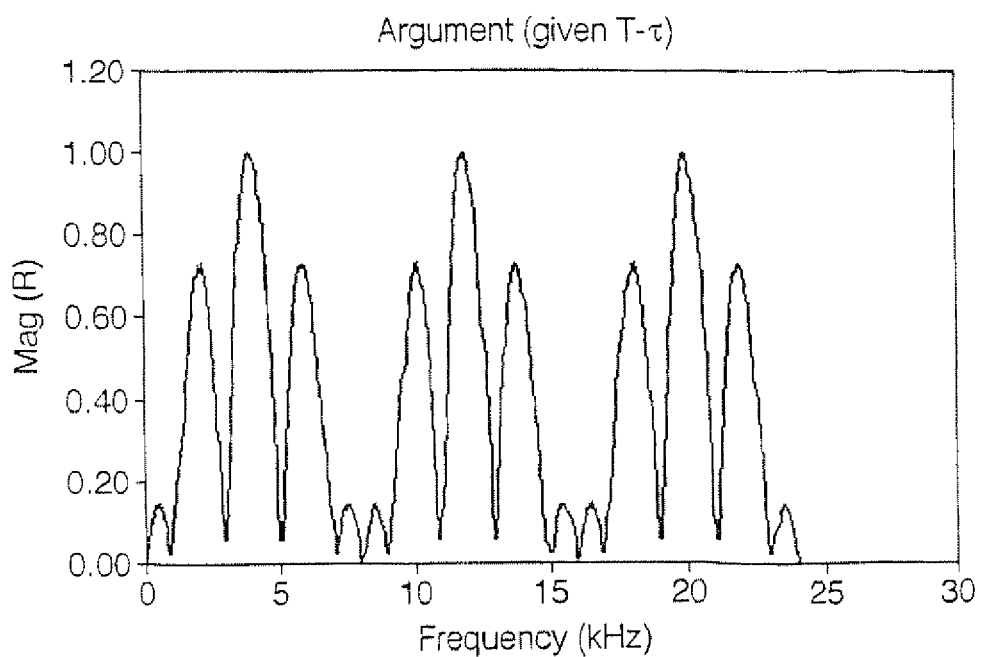
FIGS. 7a and 7b show theoretical curves.
Figure 7B:
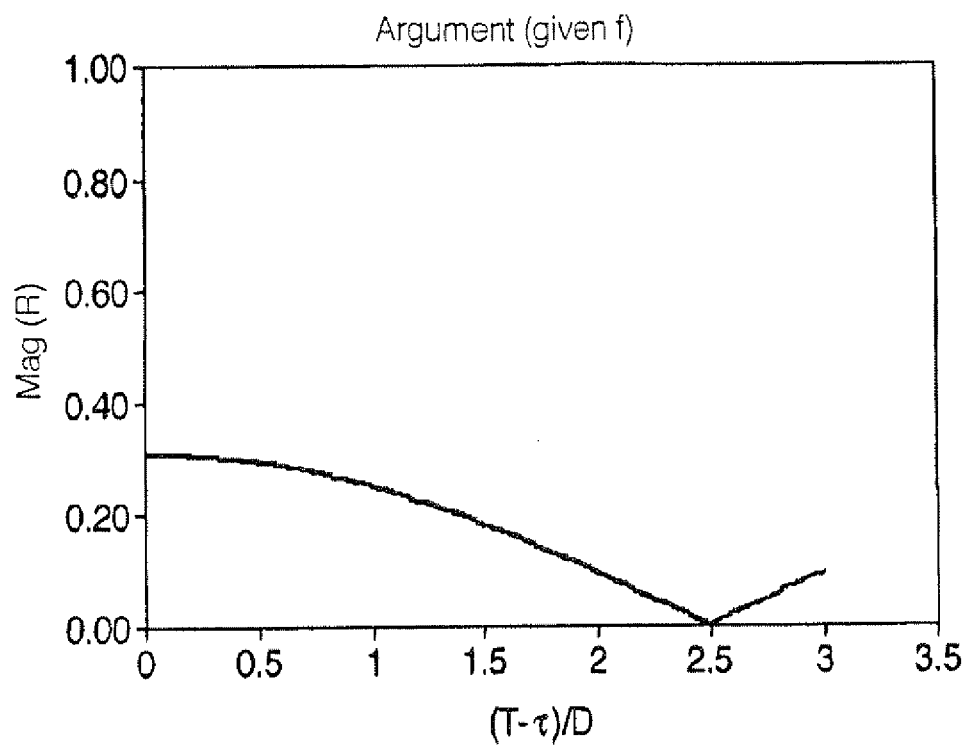

FIGS. 7a, 7b show examples plots of equation (2c) for various values of modulating frequency, interferometer delay D, and relative disturbance location (T−τ)/D, in particular for 4a=1, D=25 km (the delay line will preferably be at least 20 km), T−τ=2D and $f_m$=0.8 kHz. FIG. 7a effectively shows how the response of the sensor, that is, its sensitivity, as a function disturbance frequency, illustrating the effects of the non linear response of the fibre to disturbances. Trace A is for a low amplitude disturbance, trace B for a high amplitude disturbance.

Pulsed probe signal: a simple way of examining the OTDR approach is now to consider the fibre as comprising n distributed reflections where each reflection is located in an OTDR range resolution cell. The cell size is defined by the duration of the OTDR probe pulse ($\tau_w$) and is typically 1 µs (corresponding to ~100 m resolution). The amplitude and phase of the signal reflected from each cell being a function of the fibre attenuation (to/from the cell) and the ensemble average of the component scattering centres within it.

Each cell now takes on the role of the discrete reflection described above and therefore defines T. Indeed, T now takes the form of a set of points $T_i$ where i=1 to n.

The formulation of the resulting signal can now be derived from equation (1) providing we introduce the excitation signal which is described by the OTDR pulse probe signal $p(t)=P_o \cdot \text{rect}[t/\tau_w]$.

$$z_{i_{ac}}(t)=K_i(t-D-2T_i)\cdot\text{Cos}\,[\phi_m(t-\tau)+\phi_m(t-2T_i+\tau)-\phi_m(t-\tau-D)-\phi_m(t-2T_i+\tau-D)] \quad (3)$$

where, $z_{i_{ac}}(t)$ is the ac component of the signal from cell i, and, $$K_i(t)=|p(t) \otimes h_i(t)|^2 \quad (4)$$

is the convolution between the OTDR probe pulse and the i-th range resolution cell.

The important point to note is that the random phase component from the scattered signal in the i-th cell is lost in the detection process ($|\cdot|^2$ operator in equation 4), so it does not impair the results.

Thus, equation (4) shows that the resulting signal with an OTDR can be interpreted using the simpler formulation of equations (1) and (2). However, the signal at each resolvable point on the OTDR trace is found by substituting the appropriate value for $T_i$ into these equations. The amplitude of the signals is also modified by the characteristic exponential decay of an incoherent OTDR signature.

Figure 8B:
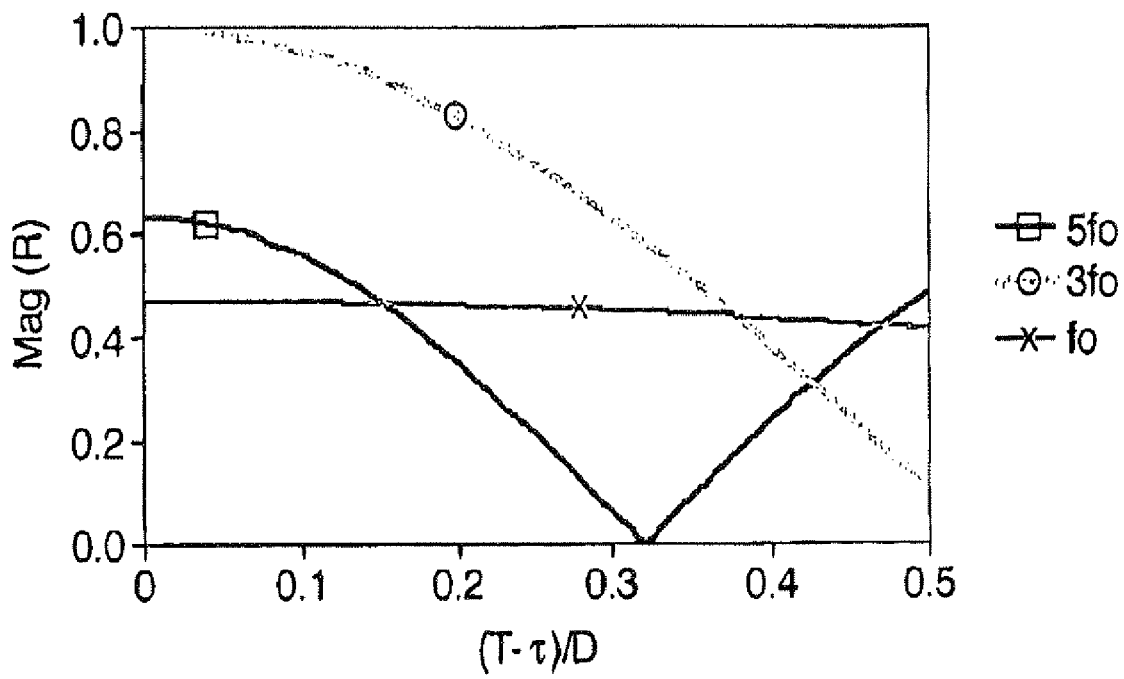
FIG. 8b shows a plurality of theoretical curves.

This simple model explains the shape of the OTDR traces seen in the practical experiments. FIG. 8a shows a single-shot measured OTDR trace with a disturbance at a frequency of 1.25 kHz located at position X (horizontal axis is time, vertical axis is the level of the (combination) signal from the interferometer stage. Curve (A) shows a typical single pulse response when the disturbance is small in magnitude. From pulse to pulse, the level moves up/down along the entire length of the trace as the disturbance varies. However, as the disturbance amplitude is increased, the trace begins to show structure along its length (curve B). This structure also vibrates up/down from pulse to pulse. (FIG. 8(a) shows measured OTDR trace from a test fibre of length ~D/2 (D=25 km). FIG. 8(b) shows theoretical magnitude of the disturbance length distribution (equation 2c) for the fundamental and first two odd harmonics of the disturbing tone.

Thus, the disturbance feature at the time position (corresponding to the spatial position) X is in this example a sharp change, here an increase, in the interference signal, although the change could be a decrease, as shown in the example of FIGS. 6a-6c.

This length dependent structure is predicted by the modelling. FIG. 8b shows the magnitude of the resulting variation depth (equation 2c) as a function of the odd harmonic frequencies that will be generated by increasing the magnitude of the disturbance. (T−τ)/D corresponds to the distance between the disturbance point "X" and the i-th scattering region. There is clearly a null at the 5$^{th}$ harmonic at a point just over half way along the fibre. The OTDR traces show the characteristic length distribution variations predicted by the theory.

Signal Processing to extract position information: The OTDR traces in FIG. 8a show that even a point disturbance can result in a distributed feature along the backscatter signature. However, the crucial point is that there is always an abrupt change in the signature at the point where the disturbance occurs. FIGS. 6b and 6c show this. These real-time analogue backscatter signals show that the start of the disturbance can be located with an accuracy that is determined by the OTDR range resolution (~1 µs in this case). Thus, the signal processing system is designed to look for these features by comparing the signal from two adjacent range-resolution cells (A) and (B). By performing the difference between them, the slower structure shown in FIG. 8a will disappear (adjacent cells are correlated unless there is a disturbance located between them). Thus, in principle, any number of simultaneous disturbances can be located by this technique.

The window detector (FIG. 2) can be used to select (A-B) features above a certain magnitude in order to produce a range marker (or bright-up spot) on the OTDR trace. Similarly, a two-dimensional "television like picture" of the disturbance can be formed. In this case, the x-direction corresponds to distance along the fibre, the y-direction to the disturbance time history for every range resolution cell, and the z-variation is driven by the window-detector output.

Sensing the Position of a Moving Vehicle

Figure 9:
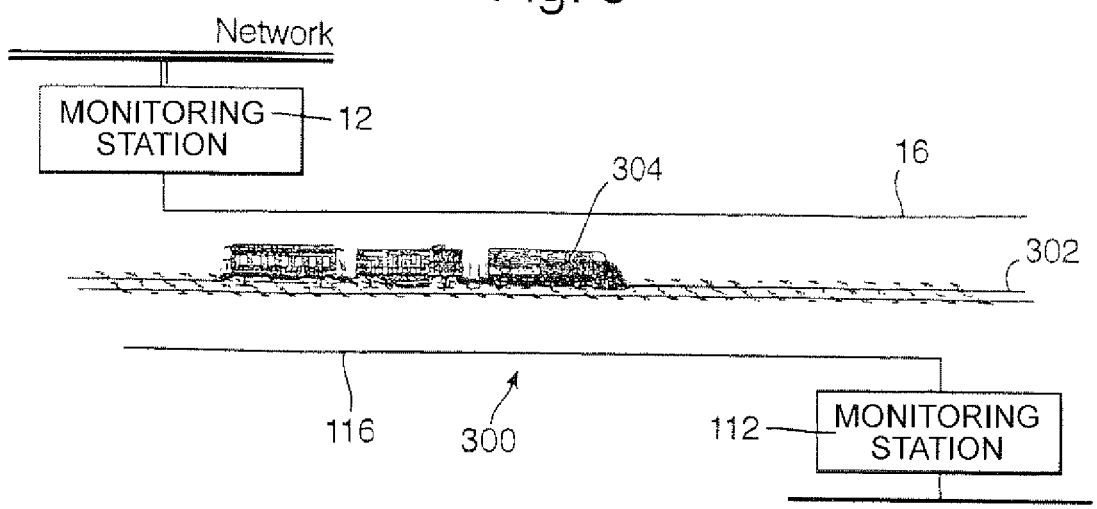
FIG. 9 shows how the position of a train may be sensed in a first embodiment.

A sensing system 300 for sensing the position of a vehicle is shown in FIG. 9 (like components with regard to previous figures having like numerals). Here, an optical fibre cable 16 (transmission link) extends along a railway track 302 in order to sense the position of a train 304 travelling along the track. The fibre cable 16 extends in a generally parallel direction to the track 302, preferably being buried in the ground or in a duct in the vicinity of the track.

At one end, the fibre cable 16 is coupled to monitoring apparatus, in the form of a monitoring station 12 (such as that shown in FIG. 1) for monitoring a physical disturbance of the fibre cable 16, in particular a dynamic disturbance. The fibre cable will be laid sufficiently close to the rail track 302 for the movement of the train 304 to cause a dynamic disturbance in the fibre cable 16, which dynamic disturbance can the sensed at the monitoring station 12. The disturbance caused by the train will generally be local to the train 304, with the result that the moving disturbance of the train will bring about a dynamic disturbance which moves along the cable 16 with a speed corresponding to that of the train. Thus, the fibre can act as a sensor which monitors vehicle movement in a spatially continuous fashion.

The fibre cable 16 will be laid along the side of the track 302, and may be buried underground or in existing ducts, sufficiently close to the track for disturbances produced by the train to propagate through the ground to reach the fibre cable 16. The fibre cable may be laid under the track, but preferably will be laid next to the track, for example at a distance of 1 m from the track. Alternatively a bore or groove extending along a rail of the track may be provided to receive the fibre cable 16, the fibre cable 16 extending along such a bore or groove. In one embodiment, an existing duct alongside the track may conveniently be used to house the cable.

Clearly, the sensitivity of the fibre cable 16 to a moving train will depend on the local circumstances, such as the distance between the fibre (or duct) and the track, ground and soil conditions, cable characteristics etc. Therefore, the sensitivity of the system may not be constant along the length fibre 16.

A further fibre cable 116 may be routed along the track, in a similar fashion to the first fibre 16, but with a monitoring station 112 coupled to an opposite end relative to that of the first fibre. Thus, when the train is far from one monitoring station, it will be closer to the other monitoring station. This will improve the sensitivity of the system as a whole, since generally, the sensitivity along any one fibre diminishes as the distance from the monitoring station for that fibre increases.

Figure 10:
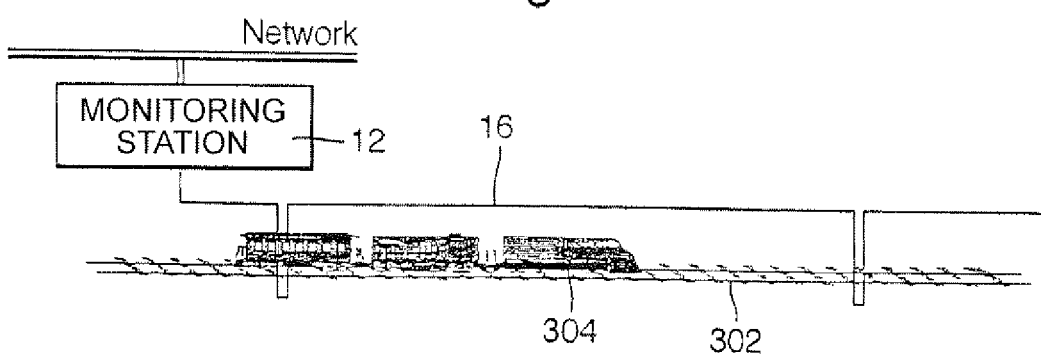
FIG. 10 shows how the position of a train may be sensed in a second embodiment; and, FIG. 11 shows how the position of a train may be sensed in a third embodiment

In order to increase the mechanical coupling between the fibre 16 and the track, the fibre may be laid under the track in a transverse direction at one or more points. Preferably, the fibre path will have one or more U-shaped portion laid under the track, as shown in FIG. 10, thereby crossing the track transversely at two points close to one another (if more than one U-shaped portion extends under the track, the spatial resolution of the monitoring station will be chosen such that the disturbances from neighbouring U-shaped portions can be distinguished from one another.

A plurality of U-shaped portions may be arranged in a side to side arrangement, for example in the vicinity of a station 306, the fibre extending generally parallel to the track between the U-shaped portions. Away from the station area, the fibre will generally extend parallel to the track, that is, in a side-by side arrangement.

Figure 11:
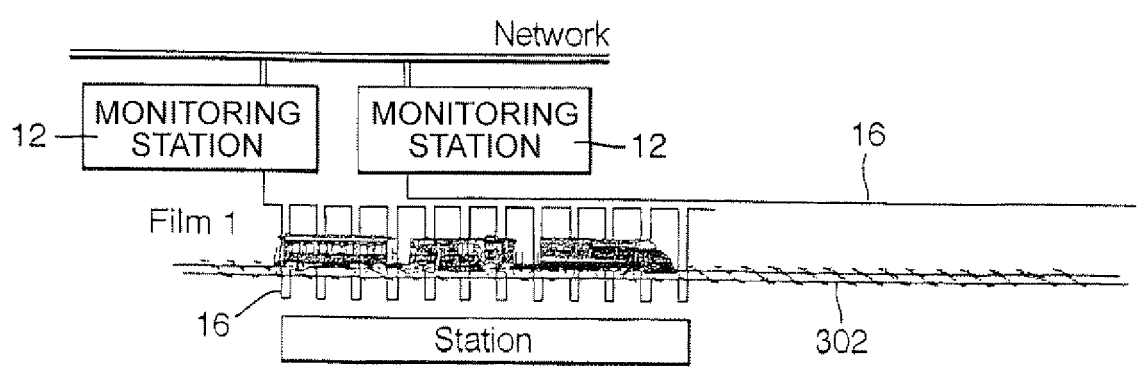

Alternatively, as shown in FIG. 11, a first fibre 16 may be arranged as a plurality of U-shaped portions, for use in a station area, whilst a second fibre 116 extending parallel to the track may be used for sensing train positions between stations.

Typically a fibre cable will extend in a generally parallel direction to the track between stations, normally for a distance of 1 km or more, preferably 10 km, such the fibre is able to sense movement over a generally continuous distance of at least 1 km, even 10 km. Clearly, the sensor system will be able to determine position with a resolution that is less than the generally continuous distance, the resolution being governed by the duration of the optical pulses and the extent of the propagation of a detectable disturbance from the train or other vehicle. Even if transverse portions are provided between generally parallel portions of fibre, there will be preferably provided at least one generally parallel portion extending at least 1 km, preferably 10 km.

It as thus be seen that the present embodiments can allow phase differences in a pair of signal copies to be combined in order to form a interference signal, so that the time-varying phase changes in a fibre brought about by a disturbance result in a phase differences between the signal pairs (one of which trails the other) which phase difference can be converted to amplitude changes in a interference signal.

In summary, in the above embodiments an optical time domain reflectometry technique is used in which a series of low coherence test pulses is launched into an the optical link, and the backscattered return signal is monitored. The test pulses pass through an unbalanced Mach Zhender interferometer with the result that for each test pulse, a pair of time-displaced pulse copies is launched onto the link. The backscattered return signal is passed through the same interferometer, which causes the pulse copes of each pair to become realigned and to interfere with one another. A time-varying disturbance is likely to affect each pulse copy of a pair differently. As a result, an abnormality such as a step is likely occur in the backscattered signal. From the time position of an abnormality, the distance of the disturbance responsible is evaluated.

What is claimed is:

1. A method of evaluating the position of a time-varying disturbance on a transmission link, the method comprising:

copying, at least in part, an output signal from an optical pulse source, such that there is a pair of signal copies by channeling light from the optical source onto first and second paths such that the power of the optical source traveling along each path is shared in a predetermined manner between the signal copies and one signal copy travels along the first path in an outbound direction with the other signal copy traveling along the second path in the outbound direction;

delaying one of the pulse copies relative to the other pulse copy in the outbound direction;

combining light traveling in the outbound direction;

transmitting the combined light of the differentially delayed pair of signal copies onto the transmission link in the outbound direction;

receiving in a return direction from the transmission link return signals comprising backscattered components comprising at least partially returned copies of said signal copies previously transmitted on said transmission link, wherein at least one of said backscattered components has suffered a phase change caused by said time-varying disturbance;

combining the received returned signal copies of a transmitted pair so as to produce a combination signal; and using a temporal characteristic in the combination signal of received returned signal copies of a transmitted pair which has traveled along the transmission link to beyond the location of the time-varying disturbance to evaluate the position of the time-varying disturbance on the transmission link, wherein the position of the disturbance is determined from the time of return of said phase-modulated backscattered components of said returned signal copies, the phase-modulated backscattered components including backscattered components of a given pair of pulse copies that are phase-modulated by the disturbance on return.

2. A method as claimed in claim 1, wherein the temporal characteristic includes the time at which a disturbance feature occurs in the combination signal.

3. A method as claimed in claim 1, wherein said returned backscattered components comprise signal copies returned by a process of distributed backscattering as the signal copies travel along the transmission link.

4. A method as claimed in claim 3, wherein the optical pulse source is signal copies are combined to give a combination signal that is distributed over time as the combined signal copy pulses travel along the transmission link.

5. A method as claimed claim 1, wherein:
the combination signal is sampled at a first set of spaced apart temporal positions and at a second set of temporal position, and
the first and second sampled sets are compared in a comparison step.

6. A method as claimed in claim 5, wherein the temporal positions of the first and second sets are interleaved.

7. A method as claimed in claim 5, wherein the comparison step involves generating a set of data which is at least in part dependent on the difference between the first and second sets.

8. A method as claimed in claim 1, wherein the differential delay is caused at an unbalanced interferometer coupled to an optical source, the interferometer having a first path and a second path, the transit time of the first path being longer than that of the second path, signal copies of a pair being caused to travel along a different respective path to one another.

9. A method as claimed in claim 8, wherein the interferometer has a first coupling stage which is coupled to the source, the coupling stage being arranged to channel one portion of the incoming radiation intensity from the source along one path, and another portion of the incoming radiation intensity along the other path, so as to form the first and second signal copies.

10. A method as claimed in claim 9, wherein the interferometer has a second coupling stage for combining radiation from the first and second paths, and for coupling the combined radiation to the common communications link.

11. A method as claimed in claim 10, wherein the signals returned from the second location are each channeled along the first and second paths by a second coupling stage, and wherein the so channeled signals are subsequently combined at the first coupling stage.

12. A method as claimed in claim 1, wherein the signal copies of a pair are delayed relative to one another at a first location, and wherein at disturbance is detectable at a second location remote from the first location.

13. A method as claimed in claim 1, wherein each of the signal copies of a pair is disturbed by a detected disturbance.

14. A method as claimed in claim 1, wherein the output signals have an average phase-coherence time associated therewith of less than 1 pico seconds.

15. A method as claimed in claim 14, wherein the signal copies of a pair have a differential delay time associated therewith, the delay time being greater than the average phase-coherence time by a factor of at least 1000.

16. A method as claimed in claim 1 wherein the transmission link includes an optical fibre extending along a guide track, the guide track being arranged to guide the movement of a vehicle, the optical fibre being arranged such that movement of the vehicle causes a disturbance along the optical fibre.

17. A method as claimed in claim 16, wherein the path of the optical channel crosses the track at intervals.

18. A method as claimed in claim 16, wherein the guide track has the form of one or more rails for guiding the movement of a train.

19. A monitoring station for monitoring a transmission link, the monitoring station comprising:
a source for generating optical pulse signals;
an interferometer stage for copying at least in part the optical pulse signals from the source such that for each optical pulse signal there is a pair of pulse signal copies, the interferometer stage having a delay stage to differentially delay one copy of each pulse signal relative to the other copy;
an output for launching the differentially delayed pulse signal copies onto the transmission link; and
a processor circuit;
wherein the interferometer stage is arranged to receive pulse signal copies returned by a process of distributed backscattering from the link and to combine the pulse signal copies so as to produce an interference signal, wherein at least one of said backscattered signal copies has suffered a phase change,
wherein the processor circuit is arranged to store the interference signal in association with an indication of a temporal characteristic of the return signal, and
wherein when said phase change is caused by a time-varying disturbance, said interference signal stored in association with an indication of a temporal characteristic of the return signal copies of a transmitted pair which has traveled along the transmission link to beyond the location of the time-varying disturbance enables the position of the disturbance to be determined from the time of return of phase-modulated backscattered components of said returned pulse signal copies, the phase-modulated backscattered components including backscattered components of a given pair of pulse copies that are phase-modulated by the disturbance on return.

20. A monitoring station as claimed in claim 19, wherein the interference signal is a time-distributed signal which varies with time, and wherein a temporal characteristic is the time variation of the return signal.

21. A monitoring station as claimed in claim 19, wherein the interference signal is a time-distributed signal, and the processor circuit is arranged to sample the interference signal at intervals, and to store the samples in association with a respective return time for each sample.

22. A sensing system for sensing the position of a moving vehicle, the sensing system comprising:
a guide track for guiding the movement of the vehicle;
an optical transmission link extending along the guide track; and monitoring apparatus coupled to the optical transmission link, wherein the optical transmission link is mechanically coupled to the guide track such that movement of the vehicle causes a moving disturbance to be sensed by sensing optical signal pulse signals propagating along the optical transmission link, wherein the monitoring apparatus comprises:
  a source for generating the sensing optical pulse signals;
  an interferometer stage for copying at least in part the optical pulse signals from the source such that for each optical pulse signal there is a pair of pulse signal copies, the interferometer stage having a delay stage to differentially delay one copy of each pulse signal relative to the other copy;
  an output for launching the differentially delayed pulse signal copies onto the transmission link; and
  a processor circuit;
  wherein the interferometer stage is arranged to receive pulse signal copies returned by a process of distributed backscattering from the link and to combine the pulse signal copies so as to produce an interference signal, wherein at least one of said backscattered signal copies has suffered a phase change, and
  wherein the processor circuit is arranged to store the interference signal in association with an indication of a temporal characteristic of the return signal,
  wherein, when said phase change is caused by a time-varying disturbance, said interference signal stored in association with an indication of a temporal characteristic of the return signal copies of a transmitted pair which has traveled along the transmission link to beyond the location of the time-varying disturbance enables the position of the disturbance to be determined from the time of return of phase-modulated backscattered components of said returned pulse signal copies, the phase-modulated backscattered components including backscattered components of a given pair of pulse copies that are phase-modulated by the disturbance on return,
  the monitoring apparatus being configured to:
    (i) detect said sensing optical pulse signal from the optical transmission link, wherein said sensing light signal is indicative of the moving disturbance,
    (ii) evaluate at least one temporal characteristic of the sensing optical signal, and
    (iii) in dependence on the evaluated temporal characteristic, determine an indication of the position of the moving disturbance along the transmission link so that the position of the vehicle along the track can be sensed.

23. A method of sensing the position of a vehicle moving along a guide track, wherein there is provided an optical transmission link extending along the guide track, and monitoring apparatus coupled to the optical transmission link, the optical transmission link being mechanically coupled to guide track such that movement of the vehicle causes a moving disturbance to be sensed by combined differentially delayed copies of a sensing optical pulse signal propagating in an outward direction along the optical transmission link, the method comprising:
  (i) detecting backscattered signal components of said outwardly propagating combined differentially delayed copies of said optical signal from the optical transmission link, said backscattered signal components being indicative of a moving disturbance;
  (ii) evaluating at least one temporal characteristic of the detected backscattered signal components;
  (iii) in dependence on the evaluated temporal characteristic, determining an indication of the position of the moving disturbance along the optical transmission link; and
  (iv) inferring the position of the vehicle from the position of the disturbance along the optical transmission link,
  wherein the position of the disturbance is determined from the time of return of phase-modulated backscattered components which have traveled along the optical transmission link to beyond the location of the time-varying disturbance, the phase-modulated backscattered components including back-scattered components of a given pair of pulse copies that are phase-modulated by the disturbance on return.

24. An apparatus for evaluating the position of a time-varying disturbance on a transmission link, the apparatus including:
  means for copying, at least in part, an output signal from an optical pulse source, such that there is a pair of pulse signal copies by channeling light from the optical source onto first and second paths such that the power of said optical source traveling along each path is shared in a predetermined manner between said signal copies and one signal copy travels along said first path in an outbound direction with the other signal copy traveling along the second path in said outbound direction;
  delay means for delaying one of the pulse copies relative to the other pulse copy in said outbound direction;
  means for combining light traveling in the outbound direction;
  means for transmitting the combined light of the differentially delayed pair of signal copies onto the transmission link in an outbound direction;
  wherein said means for combining provides means for receiving in a return direction from the transmission link return signals comprising backscattered components comprising at least partially returned copies of said signal copies of a transmitted pair which has traveled along the transmission link to beyond the location of the time-varying disturbance previously transmitted on said transmission link, wherein at least one of said backscattered components has suffered a phase change caused by said time-varying disturbance;
  wherein said means for copying provides means for combining the received returned signal copies of a transmitted pair so as to produce a combination signal; and
  means for evaluating using a temporal characteristic in the combination signal the position of the time-varying disturbance on the transmission link, whereby the position of the disturbance is determined from the time of return of said phase-modulated backscattered components of said returned signal copies, the phase-modulated backscattered components including backscattered components of a given pair of pulse copies that are phase-modulated by the disturbance on return.

25. An apparatus for evaluating the position of a time-varying disturbance on a transmission link, the apparatus including:
  an optical pulse source;
  a first differential power splitter for copying, at least in part, an output signal from said optical pulse source, such that there is a pair of signal copies by channeling light from the optical source onto first and second paths such that the power of said optical source traveling along each path is shared in a predetermined manner between said signal copies and one signal copy travels along said first path in an outbound direction with the other signal copy traveling along the second path in said outbound direction;

a delay stage for delaying one of the pulse copies relative to the other pulse copy in said outbound direction;

a coupler for combining light traveling in the outbound direction;

a transmitter for transmitting the combined light of the differentially delayed pair of signal copies onto the transmission link in an outbound direction;

wherein the coupler is arranged to act as a second power splitter for light received in a return direction from the transmission link, wherein the light received in the return direction comprises backscattered components of said combined signal copies of a transmitted pair which has traveled along the transmission link to beyond the location of the time-varying disturbance originally transmitted in said outbound direction, wherein at least one of said backscattered components has suffered a phase change caused by said time-varying disturbance, such that the intensity of the return signals is split with one portion being channeled along the first path, and the other portion being channeled along the second path;

wherein said first differential power splitter functions to combine the received returned signal copies of a transmitted pair so as to produce a combination signal;

a signal processing system for evaluating using a temporal characteristic in the combination signal the position of the time-varying disturbance on the transmission link, wherein the position of the disturbance is determined from the time of return of said phase-modulated backscattered components of said returned signal copies, the phase-modulated backscattered components including backscattered components of a given pair of pulse copies that are phase-modulated by the disturbance on return.

26. A apparatus as claimed in claim 25, wherein the monitoring means includes a display device for displaying the combination signals as a function of time.

27. A apparatus as claimed in claim 24, wherein delay means is provided by an interferometer stage, the interferometer stage having first and second transmission legs and coupling means for coupling to or from the first and second legs, and wherein the means for copying output signals and the means for combining the received signal copies are formed in common by the coupling means.

* * * * *